(12) United States Patent
Ishikawa et al.

(10) Patent No.: US 10,602,102 B2
(45) Date of Patent: Mar. 24, 2020

(54) PROJECTION SYSTEM, IMAGE PROCESSING APPARATUS, PROJECTION METHOD

(71) Applicant: Ricoh Company, Ltd., Tokyo (JP)

(72) Inventors: Masaaki Ishikawa, Kanagawa (JP); Yukinaka Uchiyama, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/032,383

(22) Filed: Jul. 11, 2018

(65) Prior Publication Data

US 2018/0324396 A1 Nov. 8, 2018

Related U.S. Application Data

(63) Continuation of application No. PCT/JP2016/087754, filed on Dec. 19, 2016.

(30) Foreign Application Priority Data

Jan. 13, 2016 (JP) .................. 2016-004067
Mar. 17, 2016 (JP) .................. 2016-053331
Oct. 14, 2016 (JP) .................. 2016-202943

(51) Int. Cl.
*G09G 5/00* (2006.01)
*H04N 9/31* (2006.01)
(Continued)

(52) U.S. Cl.
CPC .......... *H04N 9/3147* (2013.01); *G03B 21/00* (2013.01); *G03B 21/14* (2013.01); *G03B 21/60* (2013.01);
(Continued)

(58) Field of Classification Search
CPC ...... H04N 9/3147; H04N 5/74; H04N 9/3185; H04N 9/3188; H04N 9/3194; G03B 21/00; G03B 21/64; G03B 21/60; G09G 5/00
(Continued)

(56) References Cited

U.S. PATENT DOCUMENTS 6,755,537 B1   6/2004  Raskar et al.
7,773,827 B2*  8/2010  Jaynes .................. G03B 37/04
                                                              345/630
(Continued)

FOREIGN PATENT DOCUMENTS

EP   1 606 937       12/2005
EP   2 849 149 A2    3/2015
(Continued)

OTHER PUBLICATIONS

Extend European Search Report dated Jan. 3, 2019 in European Patent Application No. 16885102.0, 11 pages.
(Continued)

*Primary Examiner* — Trang U Tran
(74) *Attorney, Agent, or Firm* — Xsensus LLP

(57) ABSTRACT

A projection system for projecting an image onto a projection body having a curve in one direction by projection units includes processors and memory, which upon execution, causes the projection system to extract a set of grid points indicating distortion of a projected image from captured calibration images; to convert each set of grid points of a target projection unit commonly extracted from captured calibration images having a calibration pattern projected on the projection body in different imaging ranges in association with the one direction onto a common coordinate system; to combine the converted sets of grid points on the common coordinate system in accordance with position; and (Continued)

to calculate a correction coefficient based on the combined sets of grid points.

14 Claims, 33 Drawing Sheets

(51) Int. Cl.
*G03B 21/00* (2006.01)
*H04N 5/74* (2006.01)
*G03B 21/14* (2006.01)
*G03B 21/60* (2014.01)

(52) U.S. Cl.
CPC .................. *G09G 5/00* (2013.01); *H04N 5/74* (2013.01); *H04N 9/3185* (2013.01); *H04N 9/3188* (2013.01); *H04N 9/3194* (2013.01)

(58) Field of Classification Search
USPC .......................................... 345/637; 348/745
See application file for complete search history.

(56) References Cited

U.S. PATENT DOCUMENTS

| | | | |
|---|---|---|---|
| 9,661,257 B2 | 5/2017 | Ishikawa et al. | |
| 9,818,377 B2 | 11/2017 | Ishikawa et al. | |
| 9,860,494 B2 | 1/2018 | Johnson et al. | |
| 2005/0271299 A1* | 12/2005 | Ajito | G06T 3/005 382/293 |
| 2006/0152680 A1 | 7/2006 | Shibano | |
| 2007/0291233 A1 | 12/2007 | Culbertson et al. | |
| 2008/0062164 A1 | 3/2008 | Bassi et al. | |
| 2009/0067749 A1 | 3/2009 | Schiewe et al. | |
| 2011/0210987 A1 | 9/2011 | Furui | |
| 2013/0141593 A1 | 6/2013 | Bassi et al. | |
| 2015/0077573 A1 | 3/2015 | Ishikawa et al. | |

FOREIGN PATENT DOCUMENTS

| | | |
|---|---|---|
| JP | 2007-148416 | 6/2007 |
| JP | 2011-180251 | 9/2011 |
| JP | 2014-171234 | 9/2014 |
| JP | 2014-192808 | 10/2014 |
| JP | 2015-056834 | 3/2015 |
| JP | 2015-111214 | 6/2015 |
| JP | 2015-158658 | 9/2015 |
| JP | 2016-519330 | 6/2016 |
| WO | WO 2004/084548 A1 | 9/2004 |

OTHER PUBLICATIONS

International Search Report dated Mar. 21, 2017 in PCT/JP2016/087754 filed on Dec. 19, 2016 (with English Translation).
Written Opinion dated Mar. 21, 2017 in PCT/JP2016/087754 filed on Dec. 19, 2016.

* cited by examiner

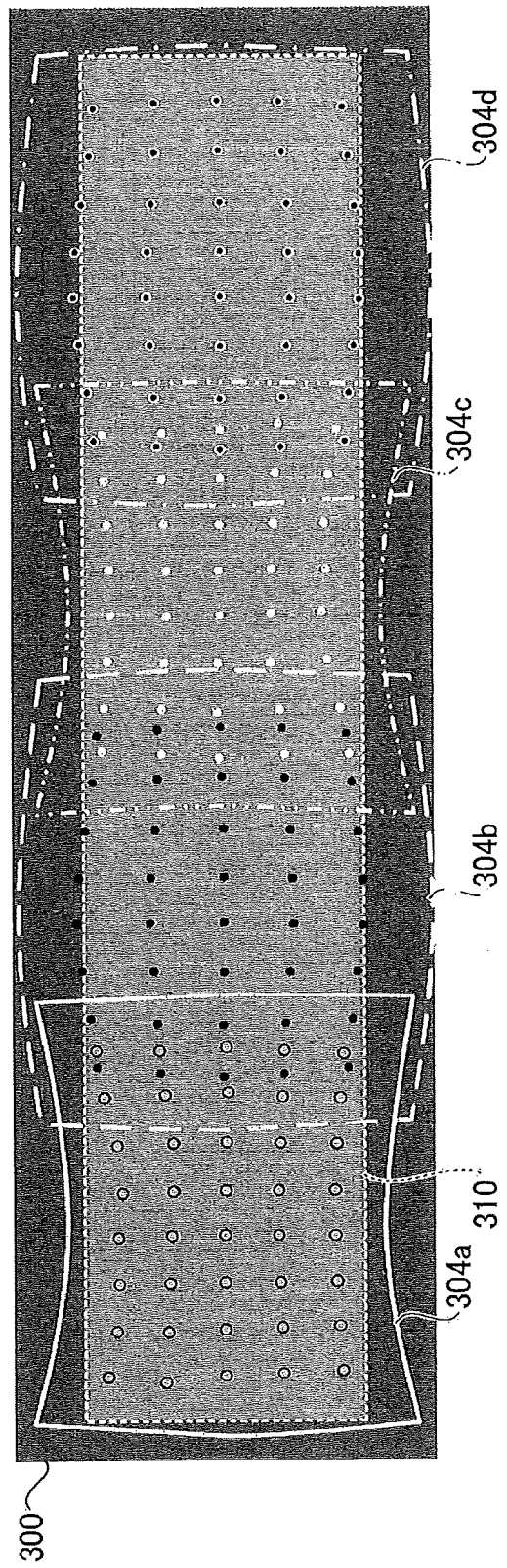

FIG.17A

| PROJECTOR COORDINATES (INTEGER) | | CONTENT COORDINATES (DECIMAL NUMBER) | |
|---|---|---|---|
| X | Y | X | Y |
| 0 | 0 | ... | ... |
| 1 | 0 | ... | ... |
| 2 | 0 | ... | ... |
| ⋮ | 0 | ... | ... |
| 1279 | 0 | ... | ... |
| 0 | 1 | ... | ... |
| 1 | 1 | ... | ... |
| 2 | 1 | ... | ... |
| ⋮ | ⋮ | ... | ... |
| 1277 | 799 | ... | ... |
| 1278 | 799 | ... | ... |
| 1279 | 799 | ... | ... |

| PROJECTOR COORDINATES (INTEGER) | | BLENDING COEFFICIENT |
|---|---|---|
| X | Y | |
| 0 | 0 | ... |
| 1 | 0 | ... |
| 2 | 0 | ... |
| ⋮ | 0 | ... |
| 1279 | 0 | ... |
| 0 | 1 | ... |
| 1 | 1 | ... |
| 2 | 1 | ... |
| ⋮ | ⋮ | ... |
| 1277 | 799 | ... |
| 1278 | 799 | ... |
| 1279 | 799 | ... |

FIG.23C
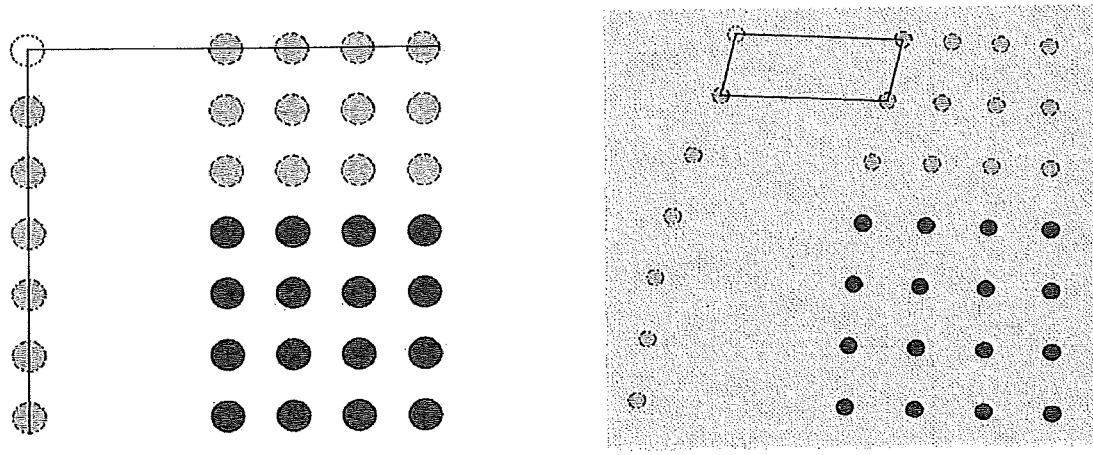
FIG.24A
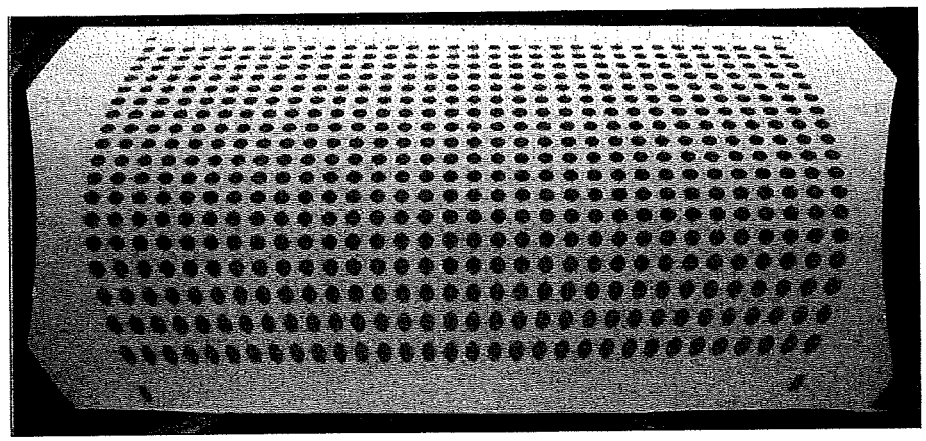
FIG.24B

PROJECTION SYSTEM, IMAGE PROCESSING APPARATUS, PROJECTION METHOD

CROSS-REFERENCE TO RELATED APPLICATIONS

The present application is a continuation application of International Application No. PCT/JP2016/087754, filed Dec. 19, 2016, which claims priorities to Japanese Patent Application No. 2016-004067, filed on Jan. 13, 2016, Japanese Patent Application No. 2016-053331, filed on Mar. 17, 2016, and Japanese Patent Application No. 2016-202943, filed on Oct. 14, 2016. The contents of these applications are incorporated herein by reference in their entirety.

BACKGROUND OF THE INVENTION

1. Field of the Invention

The disclosures discussed herein relate to a projection system, an image processing apparatus, and a projection method.

2. Description of the Related Art

Digital signage using projectors has recently been brought into practice. There are many curved surface portions around us; side surfaces and ceilings of a train, arch-shaped ceilings of tunnels, arcade shopping streets, and the like all have such a curved surface portion having a plane folded in a curved shape only in a vertical direction. In addition, space above windows of a train is used for posting advertisements. In view of such a background, there is a demand for projecting an image onto a curved surface as described above.

Calibration is typically performed for projecting a desired image onto a projection body such as a screen using projectors. For example, Japanese Unexamined Patent Publication No. 2015-056834 (Patent Document 1) discloses an example of a calibration process in multi-projection. According to a related art technique disclosed in Patent Document 1, a calibration pattern is projected onto a screen and calibration is performed by imaging the projected calibration pattern multiple times using an imaging device such as a camera. The above-described calibration technique enables multiple projectors to appropriately correct an image to project a corrected image on a planar screen.

However, projecting an image onto a screen having a curved surface that is curved in one direction (e.g., in a vertical direction) such as an inner wall of a cylinder may give a viewer an incongruent sense. For example, when a viewer, who is away from a viewpoint of a camera at the time of calibration, observes an image projected on a projection body (screen) having a curved surface, the viewer sees an entire corrected image that bulges at both ends.

SUMMARY OF THE INVENTION

The present invention has been made in view of the above-described points, and an object of the present invention is to provide a projection system for projecting an image on a projection body having a curve in one direction by one or more projection units, which is enabled to correct the projected image in consideration of observation from multiple viewpoints.

According to an aspect of embodiments, a projection system for projecting an image onto a projection body having a curve in one direction by one or more projection units includes
a grid point extraction unit configured to extract a set of grid points indicating distortion of a projected image from each of a plurality of captured calibration images prepared;
a grid point converting unit configured to convert each set of grid points of a target projection unit commonly extracted from a selected plurality of captured calibration images selected from among the plurality of captured calibration images onto a common coordinate system, the selected plurality of captured calibration images having a calibration pattern projected on the projection body captured in different imaging ranges in association with the one direction;
a grid point combining unit configured to combine a plurality of the converted sets of grid points of the target projection unit on the common coordinate system in accordance with position; and
a correction coefficient calculator configured to calculate a correction coefficient based on the combined sets of grid points.

RELATED-ART DOCUMENT

Patent Document

[Patent Document 1] Japanese Unexamined Patent Application Publication No. 2015-056834

BRIEF DESCRIPTION OF THE DRAWINGS

Other objects and further features of embodiments will be apparent from the following detailed description when read in conjunction with the accompanying drawings, in which:

FIG. 16A is a diagram illustrating projection ranges of four projectors on an integrated coordinate system, a corrected projection target area, and a projection content image;

FIG. 17A is a diagram illustrating a data structure of a geometric correction coefficient;

FIG. 23C is another diagram illustrating a process at each stage of an extrapolation prediction process executed by an image processing apparatus in a video projection system according to another embodiment;

FIG. 24A is a view illustrating calibration accuracy based on a linear extrapolation prediction result according to another embodiment;

FIG. 24B is another view illustrating calibration accuracy based on a linear extrapolation prediction result in another embodiment;

DESCRIPTION OF THE EMBODIMENTS

The following illustrates an embodiment; however, the embodiment is not limited to embodiments described below. Note that with respect to embodiments described below, an illustration is given of an example of a projection system, with a video projection system including one or more projectors as projection units, one camera as an imaging unit, and an image processing apparatus configured to perform overall control of the video projection system.

Overall Configuration

Figure 1:
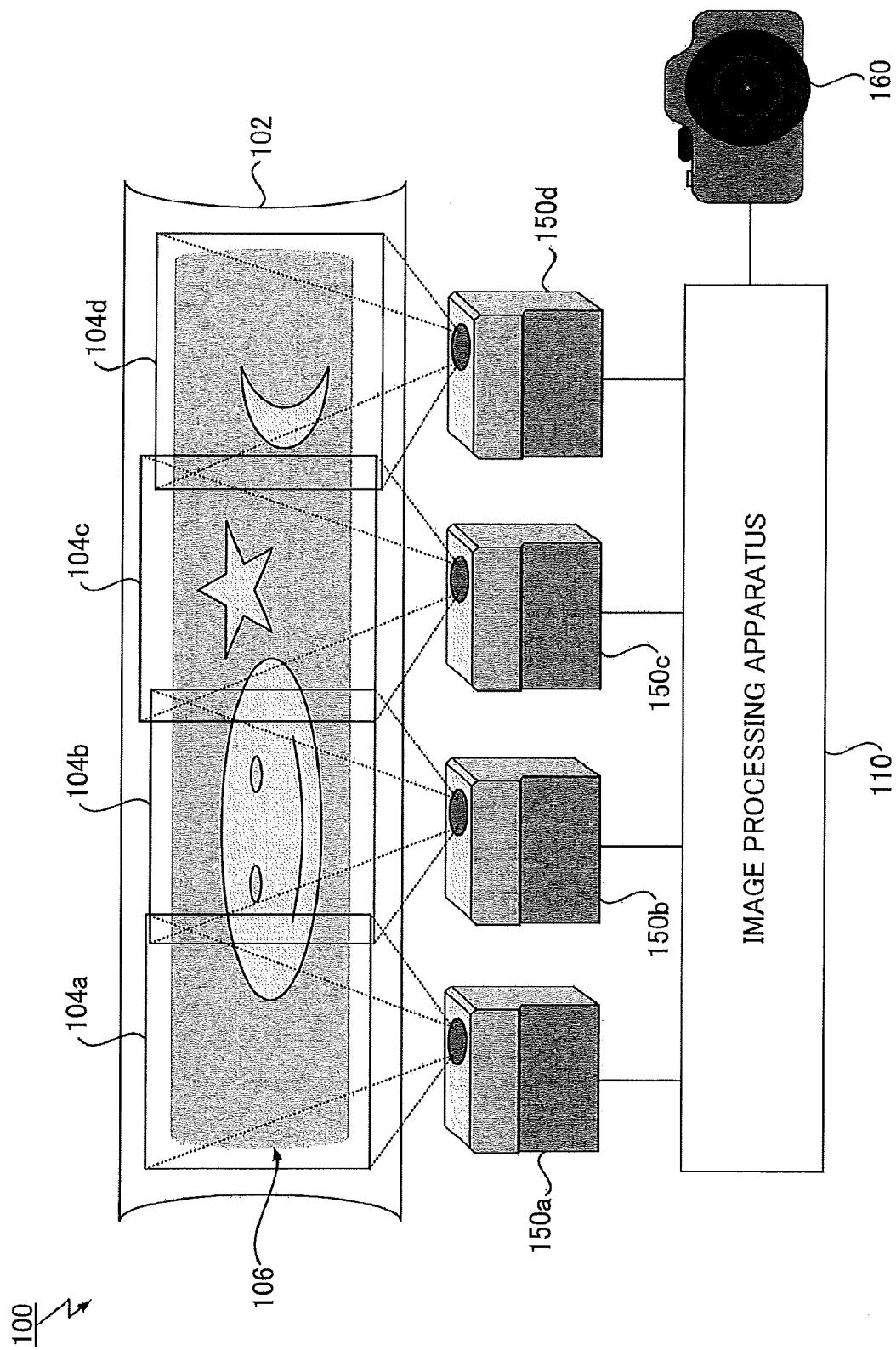
FIG. 1 is a schematic diagram illustrating an overall configuration of a video projection system according to an embodiment.

FIG. 1 is a schematic diagram illustrating an overall configuration of a video projection system 100 according to an embodiment. The video projection system 100 depicted in FIG. 1 includes an image processing apparatus 110 configured to perform overall control of the video projection system 100, one or more projectors 150 (e.g., 150a to 150d), and a camera 160. According to the embodiments to be described below, the video projection system 100 has a configuration compatible to a so-called large-screen multi-projection, which is configured to combine images projected by four projectors 150a to 150d onto a projection surface so as to project an image in larger an area than an area in which an image is projected by a single projector.

The number of the projectors 150 is not particularly specified. The video projection system 100 may be configured to manage normal projection using one projector 150. Alternatively, the video projection system 100 may be configured to manage so-called stacking-projection; that is, images projected by multiple projectors 150 are superimposed on a projection surface to have a superimposed image projected in an area equivalent to that of a single projector or the like.

The image processing apparatus 110 may be a general-purpose computer such as a personal computer, a workstation, or the like. Note that the image processing apparatus 110 is not limited to a general-purpose computer, and may be installed as a dedicated controller or may be incorporated in any one of the projectors 150.

The projector 150 is a projection device that adopts a liquid crystal system, a CRT (Cathode Ray Tube) system, a DLP (Digital Light Processing) system, an LCOS (Liquid Crystal On Silicon) system, or the like. The camera 160 is an imaging apparatus including an image sensor such as a CMOS (Complementary Metal Oxide Semiconductor) or a CCD (Charge Coupled Device) and an image forming optical system such as a lens for forming an image on a light receiving area of the image sensor. The camera 160 may be configured as a dedicated device such as a WEB camera, a digital still camera, a digital video camera or the like, or may be configured as a device incorporated in a general-purpose device such as a smartphone terminal or a tablet terminal.

In the video projection system 100, a screen 102, which is a projection body for providing a projection surface, is installed. In the embodiment to be described, the screen 102 has a cylindrical shape having a curve along a vertical direction depicted in FIG. 1, and its cylindrical inner wall acts as a projection surface. Multiple projectors 150 illustrated in FIG. 1 are installed such that respective central positions of projected images are shifted on the screen 102 in a horizontal direction that intersects the curve of the screen 102. Note that according to the embodiments to be described, an inner wall of a cylinder having a curve in a vertical direction is provided as the screen 102. However, the present invention is not limited to this example, and any curved surface having a curve in one direction may be provided as the screen 102.

The image processing apparatus 110 generates multiple projection images that are to be projected by multiple projectors 150a to 150d, and outputs the respective projection images to the projectors 150a to 150d. The projectors 150a to 150d project respective projection images received from the image processing apparatus 110 onto the screen 102. As illustrated in FIG. 1, projected images 104a to 104d input from the respective projectors 150a to 150d are projected on the screen 102. The multiple projected images 104a to 104d are superimposed on a projection surface to be combined into a single projection image 106.

During a projection mode, the video projection system 100 projects a single projection image 106 using the multiple projectors 150a to 150d as described above; however, a calibration process is performed before the above-described projection mode. The camera 160 illustrated in FIG. 1 is used for this calibration process. During the calibration mode, the image processing apparatus 110 outputs calibration images to the respective multiple projectors 150a to 150d, and causes the multiple projectors 150a to 150d to project the calibration images as calibration projection images on the screen 102. The camera viewpoint and the field of view are set such that a projected image 104 on the screen 102 projected by a predetermined projector 150 falls within the angle of view of the camera 160, and a calibration image is obtained by capturing the projected image 104 multiple times.

The captured image obtained by the camera 160 (hereinafter, the captured image having the calibration projection image is referred to as a "captured calibration image") is transmitted to the image processing apparatus 110 via a wireless connection such as a wireless LAN (Local Area Network), Bluetooth (registered trademark), and the like, or via a wired connection such as a wired USB, a wired LAN, and the like. Alternatively, the captured calibration image captured by the camera 160 is read by the image processing apparatus 110 via a removable medium such as an SD card or a compact flash (registered trademark).

The image processing apparatus 110 calculates various correction coefficients of projected images of the projectors 150a to 150d using the input captured calibration images. During the projection mode, the image processing apparatus 110 generates respective corrected projection images to be projected by the projectors 150a to 150d based on the various calculated correction coefficients. The following illustrates, with reference to FIGS. 2 to 17, a calculation process of various correction coefficients and a correction process based on correction coefficients.

Functional Configuration

Figure 2:
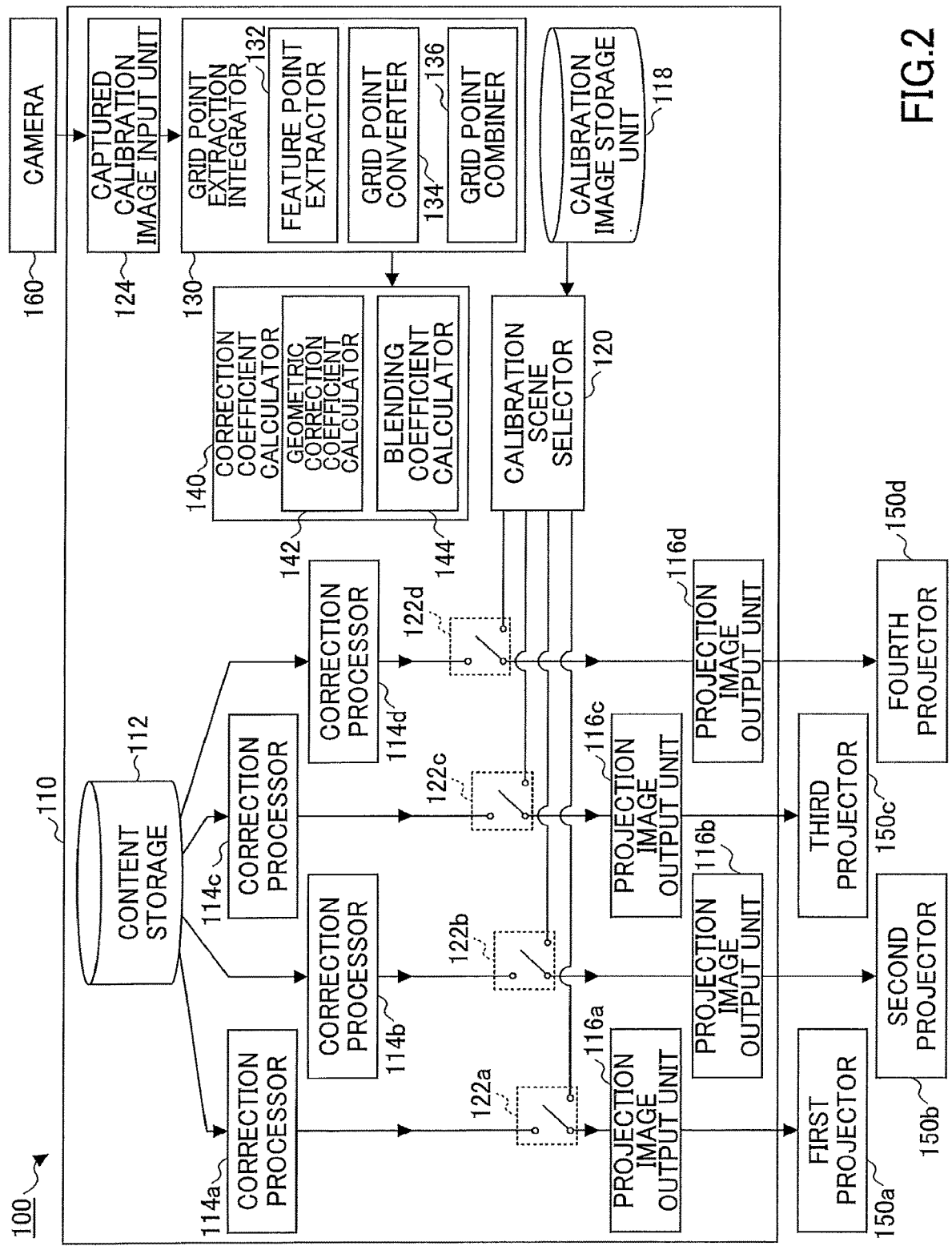
FIG. 2 is a functional block diagram illustrating a video projection system according to an embodiment.

FIG. 2 is a functional block diagram illustrating a video projection system 100 (hereinafter may also simply called the "system 100") according to an embodiment. The system 100 illustrated in FIG. 2 includes multiple functional blocks that operate on the image processing apparatus 110. The image processing apparatus 110 is configured to include a content storage unit 112, a correction processor 114 for each projector (e.g., 114a to 114d), a projection image output unit 116 for each projector (e.g., 116a to 116d), and a switching unit 122 for each projector (e.g., 122a to 122d). The image processing apparatus 110 further includes a calibration image storage unit 118, a calibration scene selector 120, a captured calibration image input unit 124, a grid point extraction integrator 130, and a correction coefficient calculator 140.

The content storage unit 112 stores a content image to be projected as a single projection image 106. The content storage unit 112 is provided as a storage area of an HDD (Hard Disk Drive), an SSD (Solid State Drive), a removable medium, and the like. Note that the content image to be projected is given as an application such as a presentation, a display screen generated by an operating system, a still image of a still image file, a frame at a given timing in a video file, or an externally input video. Hereinafter, a case where a content image is given as a still image will be described as an example for convenience of illustration.

The correction processors 114a to 114d and the projection image output units 116a to 116d are provided corresponding to the projectors 150a to 150d included in the system 100. The correction processors 114 each read a content image from the content storage unit 112, perform a correction process, and generate a projection image for a corresponding one of projectors. The projection image output unit 116 is configured to include a display output connected to the corresponding projector 150, and to output a video image of the input image selected by the corresponding switching unit 122 to the connected projector 150.

The switching units 122a to 122d switch a sequential process of an image according to the operation mode of the system 100. During the projection mode in which the content image is projected, the switching unit 122 switches the input side to the output of the correction processor 114. Accordingly, the projection image output units 116 each output a result of processing based on the content image by the corresponding correction processor 114. During the calibration mode, the switching unit 122 switches the input side to the output of the calibration scene selector 120 described later. Accordingly, the projection image output units 116 each output a calibration image selected and output by the calibration scene selector 120.

The calibration image storage unit 118 stores a calibration image to be projected by the projectors 150 during the calibration mode. The calibration image storage unit 118 is provided as a storage area for an HDD, an SSD, and the removable medium. The calibration image is not particularly specified, but is typically given as a still image prepared in advance.

Figure 3A:
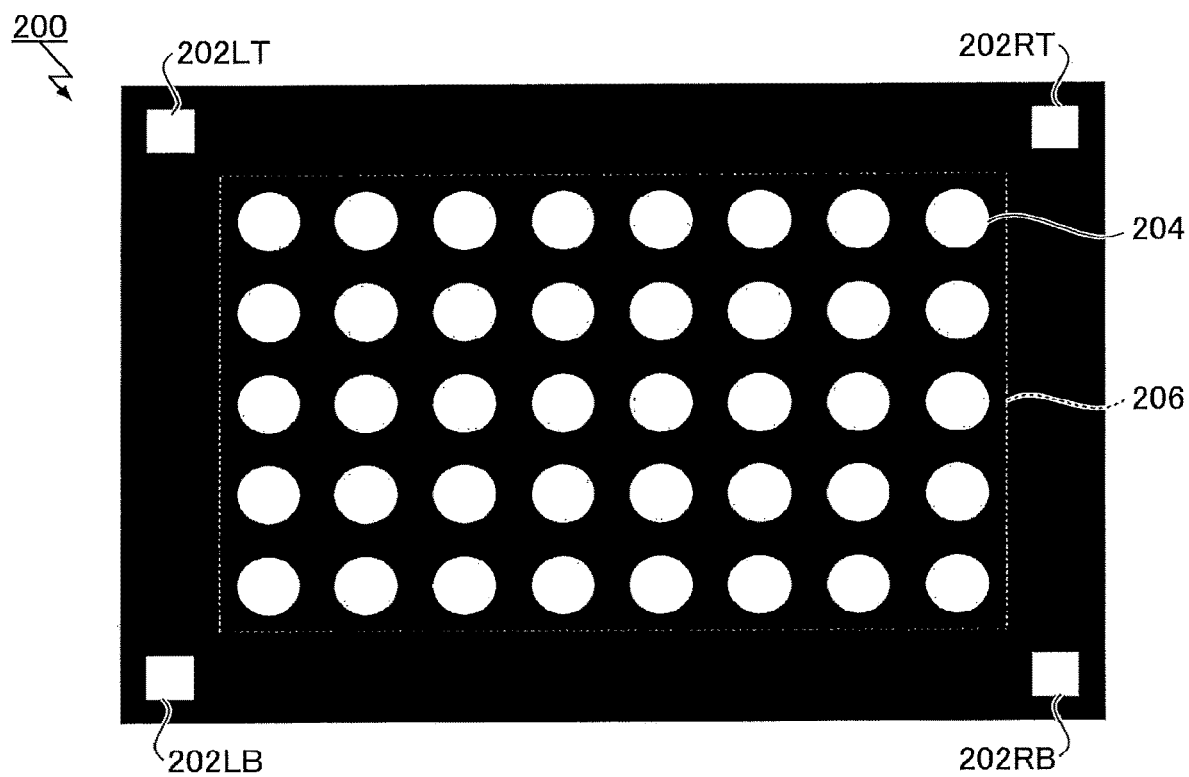
FIG. 3A is a diagram illustrating a calibration image used in a video projection system according to an embodiment.
Figure 3B:
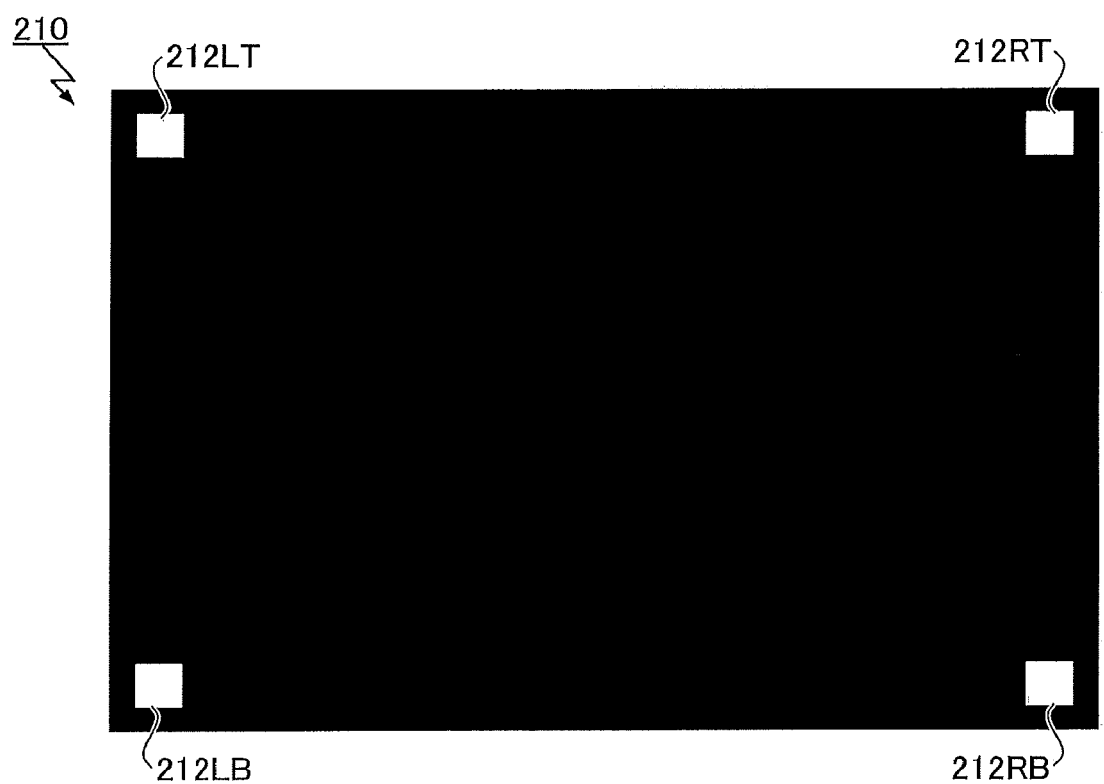
FIG. 3B is a diagram illustrating another type of a calibration image used in a video projection system according to an embodiment.

Note that the calibration image includes both or one of a calibration pattern that defines grid points of the projected image and an alignment pattern that defines alignment points of the projected image. FIGS. 3A and 3B are diagrams illustrating two types of a calibration image used in the video projection system 100 according to an embodiment. FIG. 3A illustrates an example of a first calibration image 200 that includes both an alignment pattern 202 having alignment points 202LT, 202RT, 202LB and 202RB, and a calibration pattern 206. FIG. 3B illustrates an example of a second calibration image 210 that includes only an alignment pattern 212 with alignment points 212LT, 212RT, 212LB and 212RB.

The calibration pattern 206 defines coordinates on a projector-memory, and is configured as a pattern formed by arranging graphic elements 204 in accordance with a predetermined rule. Trapezoidal distortion and local distortion of the projected image may be detected by capturing the calibration pattern 206 projected on the screen 102 and extracting grid points from the captured calibration pattern 206 projected on the screen 102. The alignment patterns 202 and 212 each define reference positions (alignment points) for projected images (images projected on a screen) between captured calibration images, and are formed by arranging multiple graphic elements at predetermined positions. By capturing an image including the common alignment pattern 202 or 212 projected on the screen 102 multiple times, it is possible to perform alignment between the multiple captured images.

Note that specific examples of patterns have been described with reference to FIGS. 3A and 3B; however, the calibration pattern 206 and the alignment patterns 202 and 212 are not particularly limited to these examples.

The following description will be given by referring back to FIG. 2. In the calibration process according to an embodiment, a calibration pattern for detecting geometric distortion of projected images projected by the projectors 150 is imaged multiple times, and multiple imaged results are integrated in accordance with the alignment pattern. The calibration scene selector 120 reads each calibration image from the calibration image storage unit 118, and selects and outputs an appropriate calibration image to each of the projectors 150a to 150d. The calibration scene selector 120 includes information for defining a positional relationship between projected images of the projectors 150, and selects one or more calibration images in accordance with each stage of the calibration process such that appropriate calibration results of respective projectors 150 may be obtained as a whole. At each stage of the calibration process, a scene having one or more calibration images to be projected by one or more projectors 150 is hereinafter referred to as a "calibration projection scene".

The calibration scene selector 120 causes each of the projectors 150 to project a calibration image corresponding to the calibration projection scene. In this case, a user uses the camera 160 to capture a projected calibration image so as to be included within the angle of view, for each calibration projection scene. The captured calibration image input unit 124 receives input of each captured image via wireless connection, wired connection, or a removable medium from the camera 160, and prepares multiple captured calibration images.

The grid point extraction integrator 130 extracts grid points of an appearing calibration pattern from each of the captured calibration images prepared by the captured calibration image input unit 124 corresponding to the calibration projection scene. The correction coefficient calculator 140 calculates various correction coefficients to be set for the correction processors 114a to 114b based on grid points of each projector 150 extracted by the grid point extraction integrator 130.

Before describing a specific calibration process, the following examines, with reference to FIGS. 4A to 4B and FIGS. 5A to 5D, an incongruent sense given to an observer when an image is projected onto a projection body having a curved surface curved in one direction (e.g., a vertical direction) such as a cylindrical inner wall.

Figure 4A:
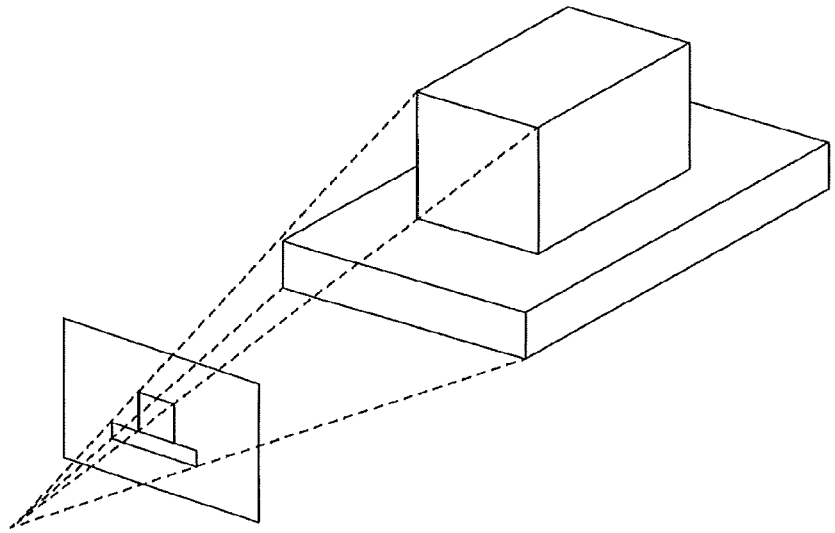
FIG. 4A is a diagram illustrating a perspective projection model.
Figure 4B:
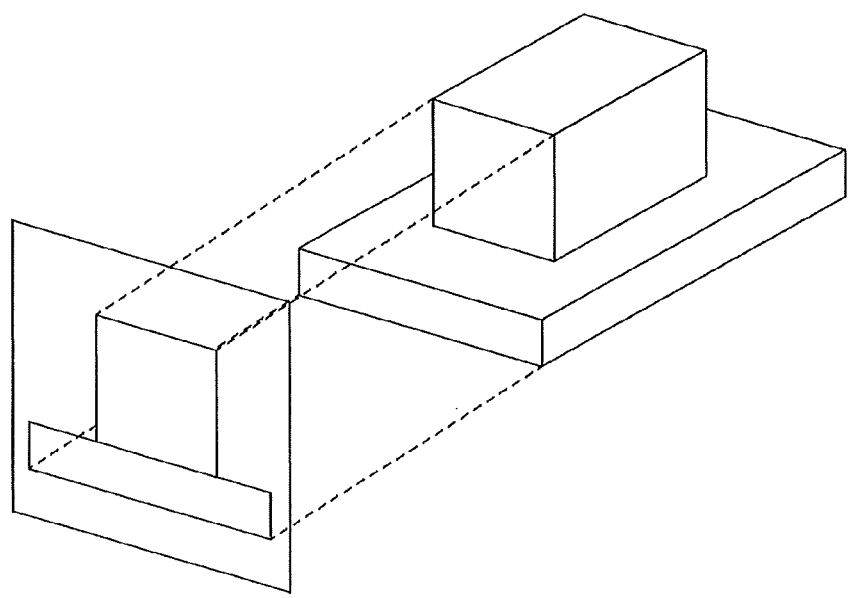
FIG. 4B is a diagram illustrating a parallel projection model.
Figure 5A:
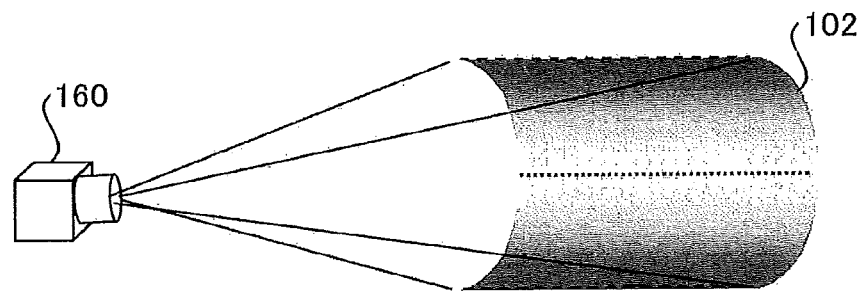
FIG. 5A is a diagram illustrating an image projected onto a cylindrical inner wall that gives an incongruent sense to an observer.
Figure 5B:
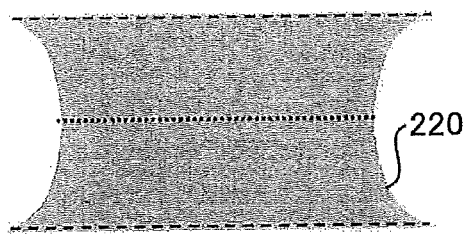
FIG. 5B is another diagram illustrating an image projected onto a cylindrical inner wall that gives an incongruent sense to an observer.
Figure 5C:
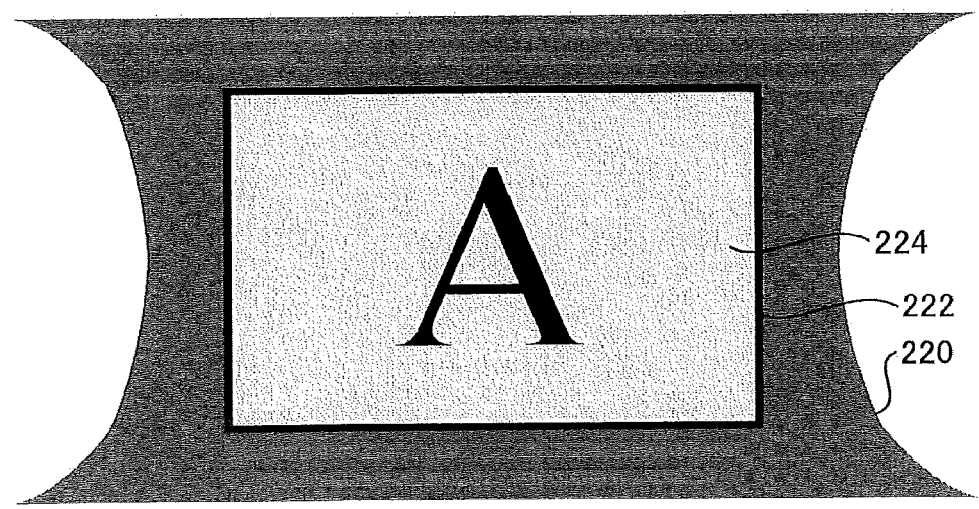
FIG. 5C is still another diagram illustrating an image projected onto a cylindrical inner wall that gives an incongruent sense to an observer.
Figure 5D:
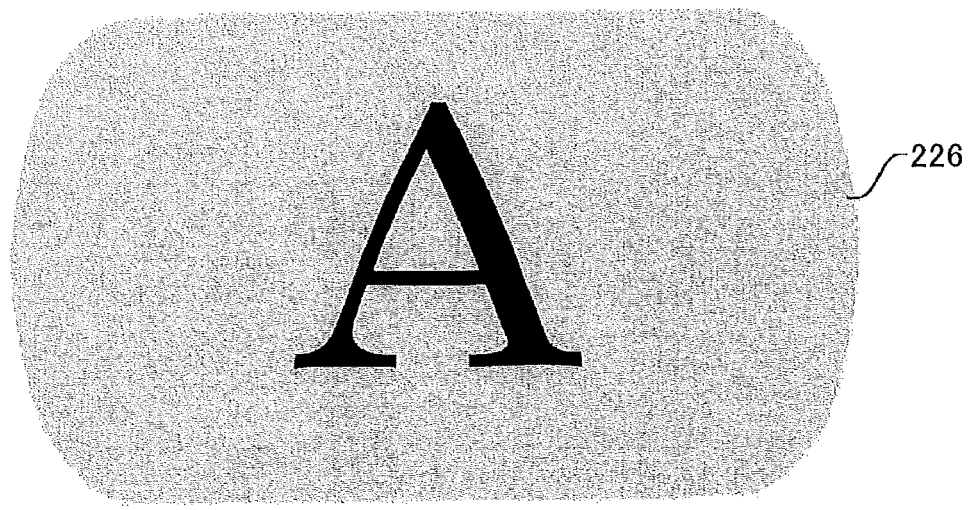
FIG. 5D is further another diagram illustrating an image projected onto a cylindrical inner wall that gives an incongruent sense to an observer.

FIG. 4A is a diagram illustrating a perspective projection model. FIG. 4B is a diagram illustrating a parallel projection model. FIG. 5A is a diagram illustrating a relationship between the camera 160 and an inner wall screen 102 of a horizontal cylinder. FIG. 5B is a diagram illustrating a screen image 220 of an inner wall screen of a horizontal cylinder imaged by the camera. FIG. 5C is a diagram illustrating a projection target area 222 having a rectangular shape on a captured image coordinate system, which is set for projecting a content. FIG. 5D is a diagram illustrating a corrected image 226 obtained by parallel projecting the corrected projected image that is corrected so as to be included in the projection target area.

According to an ordinary calibration method, when an image is projected onto the screen 102 such as an inner wall of a cylinder, the entire corrected image appears to bulge at both ends of the screen 102. This may give an observer an incongruent sense, as described above. This is because, when calibration is performed using a camera, the camera normally corrects a projection image (an image projected on the screen) such that the corrected projection image forms a rectangular shape on the captured image coordinate system, because the camera regards coordinates of the captured image the same as coordinates of the screen. Note that such deficiency is observed when imaging of a calibration pattern is divided into a plurality of times, and also when imaging of a calibration pattern is performed collectively to include the entire screen in angle of view by a camera fixed to a tripod. Accordingly, the following illustrates an example of a case where a projected image projected by a single projector is corrected by collective imaging.

Capturing an image by a camera corresponds to converting a three-dimensional coordinate system (X, Y, Z) into a two-dimensional coordinate system (x, y); capturing an image by a camera may be modeled by perspective projection transformation (illustrated in FIG. 4A) as illustrated in an upper part of the following formula (a). However, perspective projection transformation generates a result differing from a result of an orthogonal projection (or parallel projection: illustrated in FIG. 4B) that directly projects (X, Y) coordinates of (X, Y, Z) on the three-dimensional coordinate system as illustrated in a lower part of the following formula (a).

[Math 1]

$$(X, Y, Z) \to \left(\frac{fX}{Z}, \frac{fY}{Z}\right) \quad \text{(a)}$$
$$(X, Y, Z) \to (x, y)$$

In a case where a rectangular flat screen is imaged from the front, the size of the projected image changes in inverse proportion to a distance to a screen in the perspective projection transformation; however, even for perspective projection transformation, the projected image appears in a rectangular shape as in the case of orthographic projection. By contrast, in a case where a curved screen such as an inner wall of a horizontal cylinder with depth is imaged from the front, the projected image is transformed into a rectangular image in the orthogonal projection; however, in the perspective projection transformation, the projected image appears in a bobbin shape as illustrated in FIG. 5B. That is, as illustrated by a dotted line and broken lines in FIGS. 5A and 5B, since the size of the projected image differs according to the depth of each position on the screen 102, e.g., the front portion being large and the back portion being small, the projected image will not result in a rectangular shape but appear distorted to form the above-mentioned bobbin shape. That is, when the screen has a curved surface, coordinates of the captured image differ from those illustrated in the xy coordinate system obtained by viewing the curved screen from the front (xy coordinate system in parallel projection).

As illustrated in FIG. 5C, when an image is corrected so as to fit in the rectangular projection target area 222 on the coordinate system of the captured image distorted in the bobbin shape, the corrected image 224 appears to be rectangular only when viewed from the camera viewpoint as a result, and will not become such a corrected image as a rectangular wallpaper being pasted on a curved surface. FIG. 5D is a diagram schematically illustrating an image obtained by projecting the corrected projected image in parallel, which results in a corrected image such as wallpaper bulged into a barrel shape being pasted on the curved surface. Therefore, when the corrected image viewed from the camera viewpoint appears in a rectangle shape, an observer who views the corrected image only from the viewpoint of the camera will not feel incongruence. However, when the corrected image viewed from the front of the left or right edge of the screen, for example, is bulged in a barrel shape compared to a corrected image such as rectangular wallpaper pasted on the screen, an observer will feel incongruence.

The above-described ordinary correction will not impose any problems when there is only one viewer and a viewing position is fixed at the center of the front of a screen, and calibration is performed by placing the camera at the viewer's position. However, when multiple viewers observe the horizontally projected image from viewpoints at various positions, those viewers observing at the ends of the projected image see the projected image appearing bulged in the barrel shape, thereby feeling an incongruent sense.

Thus, in the case as described above, it is preferable to make correction in which the corrected image (projected image) appears like rectangular wallpaper pasted on a curved surface. This is because a human-being is expected to conceive an original rectangular image as a rectangular image being pasted on to a curved surface without feeling incongruence such as from a poster pasted on a curved surface of a round column or label pasted on a wine bottle.

Hence, with respect to a target projector, among one or more projectors 150, the captured calibration image input unit 124 prepares multiple calibration images captured in different imaging ranges associated with a direction in which the target projector projects a calibration pattern on the curved surface screen 102. The grid point extraction integrator 130 extracts a set of grid points indicating distortion of the projected image projected by a target projector (a projector of interest) from each of the prepared captured calibration images. The grid point extraction integrator 130 converts each set of commonly extracted grid points (of the projection image of the target projector) into a common coordinate system. The grid point extraction integrator 130 combines multiple sets of grid points (of the projection image of the target projector) on the common coordinate system according to respective positions to generate a combined set of grid points. Then, the correction coefficient calculator 140 calculates a correction coefficient for the projector based on the combined set of grid points.

Accordingly, with respect to a projection body (i.e. screen) having a curve in one direction, the projected image may be corrected so as not to give an incongruent sense to viewers who view the projected image from multiple viewpoints.

Figure 6:
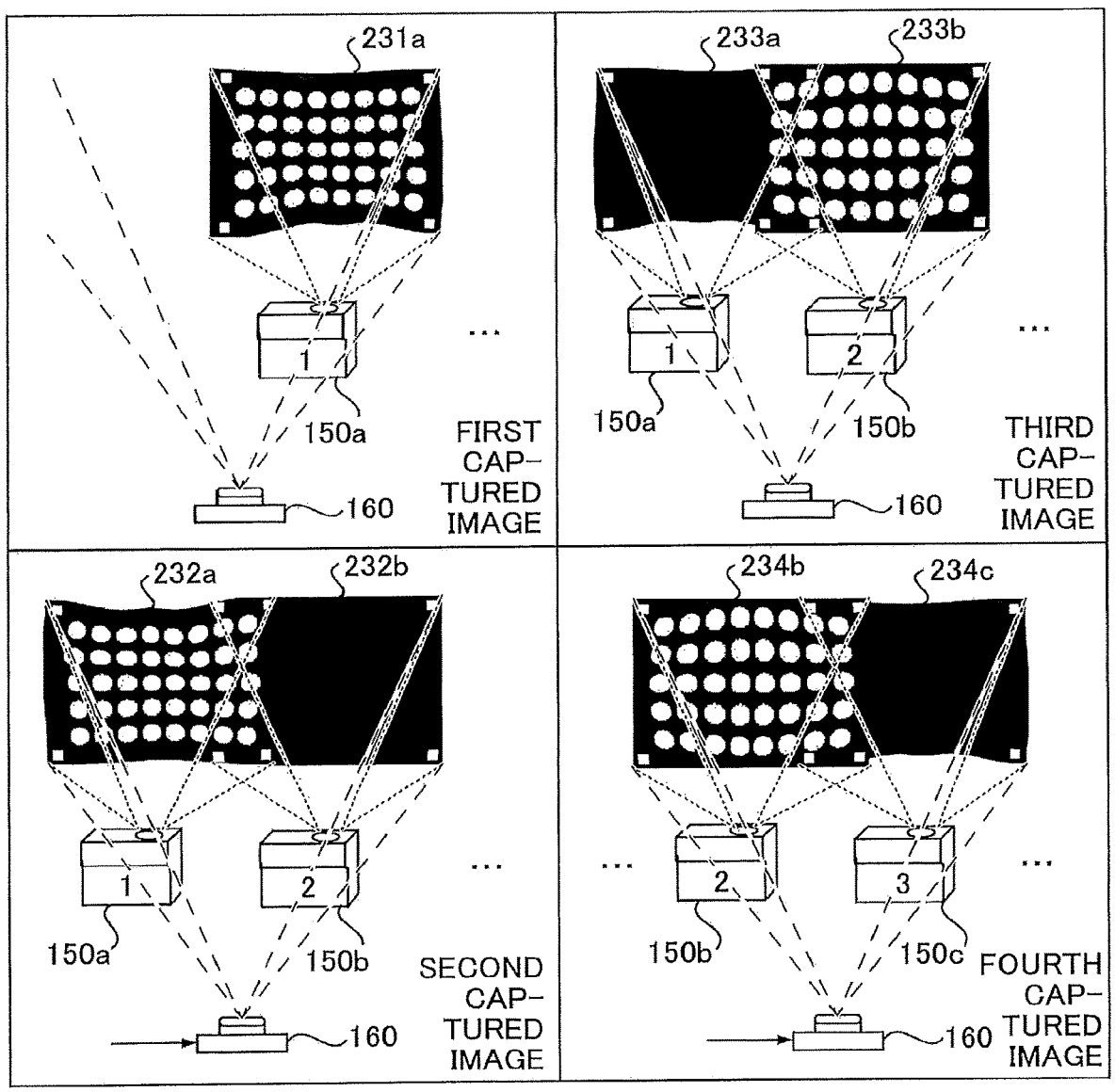
FIG. 6 is a diagram illustrating calibration projection scenes sequentially selected by a calibration scene selector, and an imaging method of the calibration projection scenes, according to an embodiment.
Figure 7:
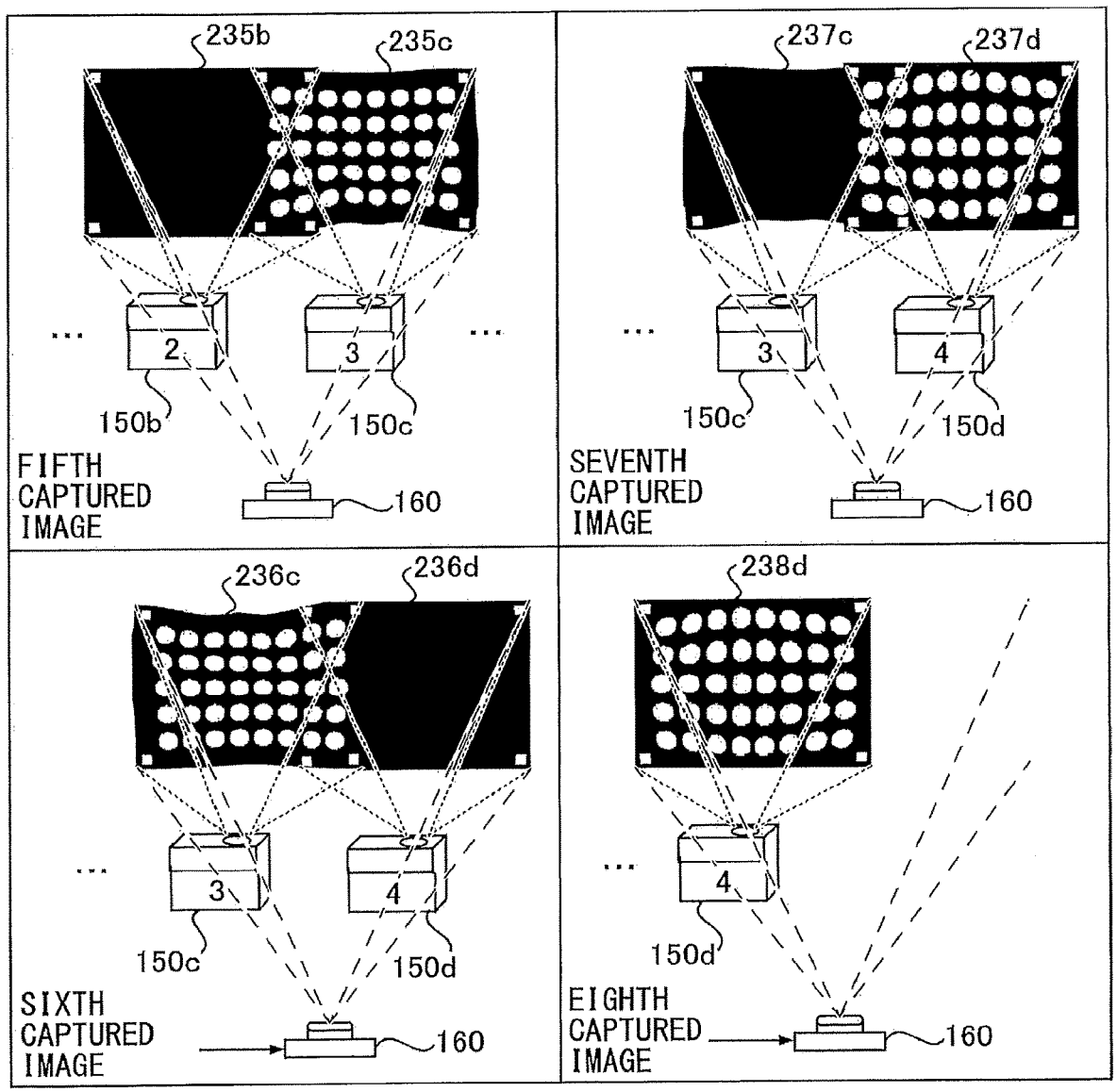
FIG. 7 is a diagram illustrating calibration projection scenes sequentially selected by a calibration scene selector, and an imaging method of the calibration projection scenes, according to an embodiment.

Hereinafter, with reference to FIGS. 2, 6, and 7, the calibration process according to an embodiment will be described in more detail. FIGS. 6 and 7 include diagrams illustrating calibration projection scenes sequentially selected by the calibration scene selector 120 illustrated in FIG. 2 and a method of capturing each calibration projection scene. In the embodiment using the four projectors 150a to 150d as illustrated in FIG. 1, calibration projection scenes may be prepared in aspects illustrated in FIG. 6 and FIG. 7 to prepare captured calibration images.

As illustrated in FIGS. 6 and 7, according to an embodiment to be described, eight calibration projection scenes corresponding to eight imaging times are prepared. In the first calibration projection scene (first captured image), the first projector 150a positioned at the left end projects a first calibration image 200 illustrated in FIG. 3A. In this case, the other projectors 150b, 150c, and 150d project none. In this first calibration projection scene, a user captures the projected image 231a of the first projector 150a, using the camera 160, to be included within the field of view (indicated by broken lines) of the camera 160; however, the projected image 231a of the first projector 150a is captured to be included in an area shifted toward the adjacent projector 150b along a horizontal direction (i.e., on the right side) in an imaging range.

In the second calibration projection scene (second captured image), the first projector 150a projects the first calibration image 200 illustrated in FIG. 3A, and the second projector 150b projects a second calibration image 210 illustrated in FIG. 3B. The third and fourth projectors 150c and 150d project none. In the second calibration projection scene, a user captures the projected images 232a and 232b projected by the first and second projectors 150a and 150b, using the camera 160, to be included in the field of view of the camera 160. In this case, focusing on the first projector 150a, the projected image 232b projected by the adjacent projector 150b is included in an adjacent projector 150b side area of the imaging range. Accordingly, the projected image 232*a* projected by the first projector 150*a* is captured to be included in an area at the ther side from the adjacent projector 150*b* along the horizontal direction (i.e., on the left side) in the imaging range.

That is, the first and second calibration images corresponding to the first and second calibration projection scenes each have an imaging range to include a calibration pattern at which the first or second calibration images are mutually shifted along a direction approximately perpendicular to a direction in which the screen 102 has a curve (i.e., the horizontal direction in the example of FIG. 1), where the calibration pattern is projected by the first projector 150*a* positioned at left end.

In the third calibration projection scene (third captured image), contrary to the second calibration projection scene, the first projector 150*a* projects the second calibration image 210, and the second projector 150*b* projects the first calibration image 200. In this case, the third and fourth projectors 150*c* and 150*d* project none, in a manner similar to the first calibration projection scene. In the third calibration projection scene, a user performs imaging in approximately the same imaging range as the second calibration projection scene. In the fourth calibration projection scene (fourth captured image) and subsequent calibration projection scenes, two sets of scenes to be projected are prepared by exchanging the first calibration image 200 and the second calibration image 210, for each combination, in the arrangement of projected images while changing the combination of two adjacent projectors 150.

The seventh calibration projection scene (the seventh captured image), which is the second from the last calibration projection scene, is included in the scenes imaged by exchanging the first calibration image 200 and the second calibration image 210; however, the fourth projector 150*d* located at the right end projects the first calibration image 200 and the third projector 150*c* projects the second calibration image 210. The first and second projectors 150*a* and 150*b* project none. In the seventh calibration projection scene, a user captures the projected images 237*c* and 237*d* projected by the third and fourth projectors 150*c* and 150*d*, using the camera 160, to be included in the field of view of the camera 160. In this case, focusing on the fourth projector 150*d*, the projected image 237*c* projected by the adjacent projector 150*c* is included in an adjacent projector 150*c* side area of the imaging range. Accordingly, the projected image 237*d* projected by the fourth projector 150*d* is captured to be included in an area at the other side from the adjacent projector 150*c* along the horizontal direction (i.e., on the right side) in the imaging range.

In the eighth calibration projection scene (eighth captured image), which is the last calibration projection scene, the fourth projector 150*d* projects the first calibration image 200. The other projectors 150*a*, 150*b*, and 150*c* project none. In the eighth calibration projection scene, in a manner similar to the first scene, a user captures the projected image 238*d* projected by the fourth projector 150*d*, using the camera 160, to be included in the field of view of the camera 160. However, contrary to the first calibration projection scene, the projected image 238*d* projected by the fourth projector 150*d* is captured, using the camera 160, to be included in an area shifted toward the adjacent projector 150*c* along the horizontal direction (i.e., on the left side) in the imaging range.

That is, the seventh and eighth calibration images corresponding to the seventh and eighth calibration projection scenes each have an imaging range to include a calibration pattern at a position at which the seventh and eighth calibration images are mutually shifted along a direction approximately perpendicular to a direction in which the screen 102 has a curve (i.e., the horizontal direction in the example of FIG. 1), where the calibration pattern is projected by the fourth projector 150*d* positioned at the right end.

As illustrated in FIGS. 6 and 7, in a case where four projectors are used, two sets of calibration projection scenes are prepared for each of the three combinations of the first and second projectors, the second and third projectors, and the third and fourth projectors; in addition, one calibration projection scene is prepared for each of the first projector and the fourth projector located at the opposite ends along the horizontal direction. Thus, a total number of eight calibration projection scenes are prepared. In the imaging of each calibration projection scene, as illustrated in FIG. 6 and FIG. 7, an imaging position of the camera 160 is moved such that the camera 160 performs imaging while shifting each of the different imaging ranges between combinations of the projectors (including for the single projector case).

Note that to capture an image in different imaging ranges is to capture an image while changing a viewpoint and/or orientation of the camera to such an extent that the projection ranges of the combinations of projectors being changed (including change from a single projector to a combination of two projectors, and vice versa) are included within the imaging range of the camera 160. Note that a substantial imaging range does not change according to shift in a viewpoint, orientation, and angle of view angle of a camera, which may occur when a user holds a camera to capture the projected images with the same composition.

The following illustrates by referring back to FIG. 2. The captured calibration image input unit 124 receives a captured image obtained by capturing the projected image projected at each of the calibration projection scenes described above and prepares multiple captured calibration images in a storage area. In a specific embodiment, with respect to a target projector 150, multiple captured calibration images obtained by capturing a calibration pattern in different imaging ranges are prepared, where the calibration pattern projected by the target projector 150 is projected on the screen 102.

The grid point extraction integrator 130 obtains grid points from each of the captured calibration images prepared by the captured calibration image input unit 124 corresponding to the above calibration projection scene. More specifically, the grid point extraction integrator 130 includes a feature point extractor 132, a grid point converter 134, and a grid point combiner 136.

The feature point extractor 132 extracts feature points from each of the prepared captured calibration images. Note that the extracted feature points may include grid points corresponding to the calibration pattern for detecting distortion of the projected image, and alignment points corresponding to the alignment pattern for alignment of positions between the calibration images. The feature point extractor 132 constitutes a grid point extractor and an alignment point extractor according to an embodiment.

The grid point convertor 134 converts multiple sets of grid points in the different imaging ranges (at this stage, each grid point is a point on the coordinate system of each captured calibration image) onto a common coordinate system, with respect to a target projector 150 to be processed, as a combining preprocess. Conversion of coordinates is performed based on the above-described alignment points.

For example, in the examples given in FIGS. 6 and 7, a projected image including the calibration pattern of the first projector 150a positioned at an end commonly appears in the first and second captured calibration images. The set of grid points in the first captured image of the first projector 150a and the set of grid points in the second captured image of the first projector 150a are subject to be processed. The grid points in the second captured image of the first projector 150a are, for example, converted into the coordinate system of the first captured image, based on the alignment pattern of the first projector 150a that commonly appears in the first and second captured images. In this way, two sets of the grid points on the coordinate system of the common first captured image are obtained.

The grid point combiner 136 combines multiple sets of grid points based on the images captured in the different imaging ranges and converted onto the common coordinate system by the grid point converter 134, and generates sets of combined grid points with respect to the target projector 150 (a projector of interest). The grid point combiner 136 constitutes a grid point combiner in this embodiment; details of a grid point combining process will be described later.

The grid point extraction integrator 130 converts the sets of grid points of all the projectors 150 onto an integrated single coordinate system. The integrated single coordinate system (hereinafter referred to as an integrated coordinate system) is not particularly specified. According to the embodiment, the integrated single coordinate system may be a coordinate system of the first calibration image that is captured while facing the screen 102.

The correction coefficient calculator 140 calculates various correction coefficients to be set with respect to the correction processors 114a to 114d, based on the set of the grid points of each projector 150 extracted by the grid point extraction integrator 130. More specifically, the correction coefficient calculator 140 includes a geometric correction coefficient calculator 142 configured to calculate a geometric correction coefficient, and a blending coefficient calculator 144 configured to calculate a correction coefficient of luminance blending of a projected image.

Here, blending is defined as a process of combining weighting of grid point coordinates for geometric correction, which differs from a process normally called "blending" in multi-projection; the normally called "blending is defined as a correcting process of weighting pixel values of an overlapping portion to exhibit brightness and color of one apparatus.

Based on the grid points on the integrated coordinate system, the geometric correction coefficient calculator 142 calculates a geometric correction coefficient for each of the projectors 150 which output projected images. A geometric correction coefficient is a correction coefficient incorporating geometrical corrections such as alignment, scale matching, and distortion correction.

The blending coefficient calculator 144 detects a superimposed area between the projected image of a target projector and the projected image of each of projectors 150 adjacent to the target projector. The blending coefficient calculator 144 calculates a blending coefficient for adjusting superimposition of these projected images based on the detection result of the superimposed area. With the blending coefficient for each projector, it is possible to smoothly combine images in a portion where the projected images of the projectors 150 are superimposed on the screen 102.

Based on the various correction coefficients calculated by the geometric correction coefficient calculator 142 and the blending coefficient calculator 144, the correction processors 114 each generate a projected image for a corresponding projector from a content image.

In the embodiment illustrated in FIG. 2, the functional units 112 to 144 are described as being implemented on a single image processing apparatus 110, but embodiments of the video projection system 100 are not limited to the embodiment illustrated in FIG. 2. In another embodiment, each of the correction processors 114a to 114d may be implemented by a corresponding one of the projectors 150a to 150d in order to reduce the load on the image processing apparatus due to the increase in the number of the projectors. In still another embodiment, the functional units 112 to 144 may be distributed across the multiple image processing apparatuses, all of the functional units 112 to 144 may be mounted on any of the projectors 150, or the functional units 112 to 144 may be configured to be mounted on a single apparatus including the functions of the image processing apparatus 110 and the functions of the multiple projectors 150. In further another embodiment, the functions of the grid point extraction integrator 130 and the correction coefficient calculator 140 may be implemented as a server that provides services via a network.

Overall Process

Figure 8:
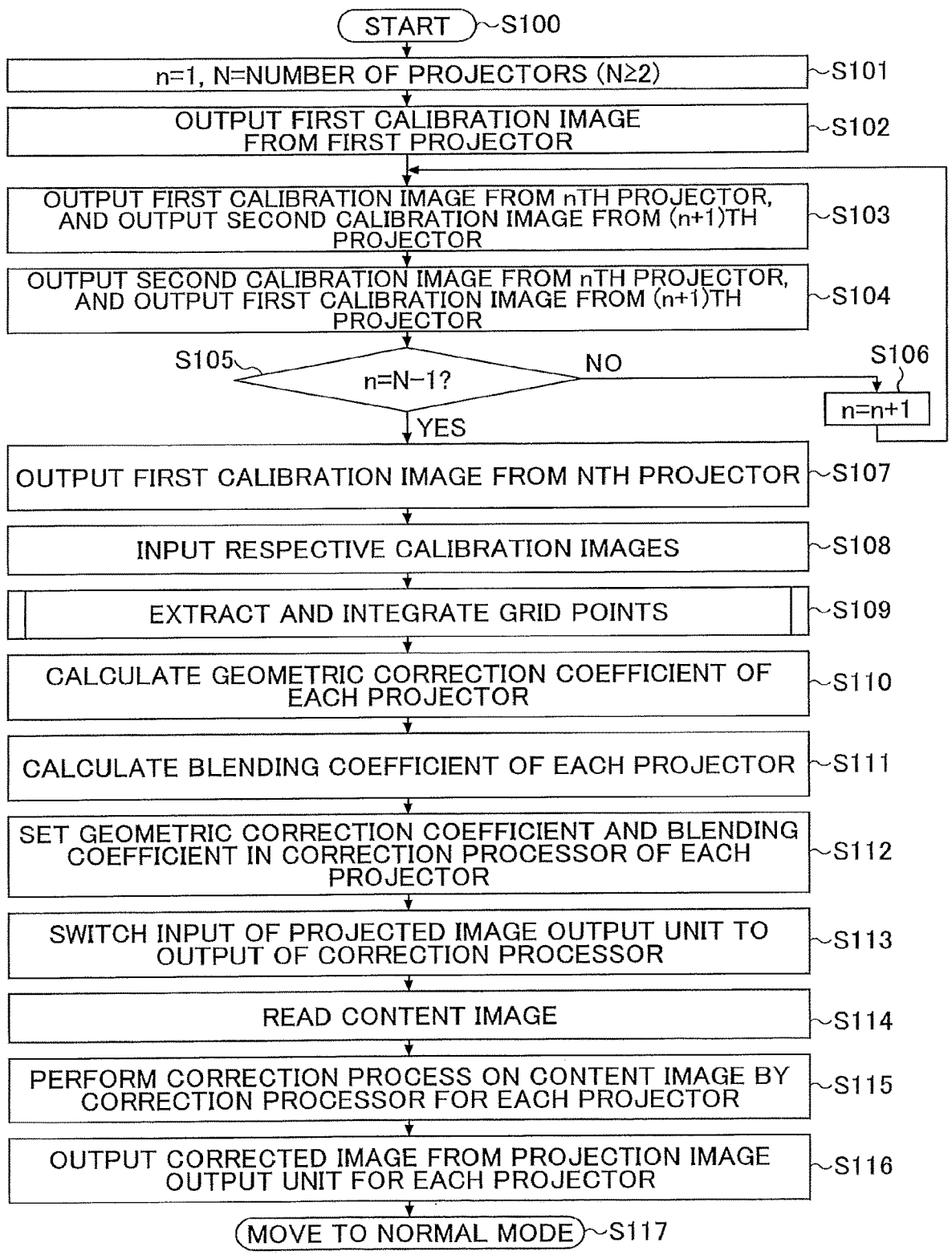
FIG. 8 is a flowchart illustrating an overall process of a grid point extraction integrating process, a various correction coefficient calculating process, and a correction process based on correction coefficients, according to an embodiment.

The following illustrates an overall correction process with reference to FIG. 8. FIG. 8 is a flowchart illustrating an overall process of a grid point extraction integrating process, a various correction coefficient calculating process, and a correction process based on correction coefficients, according to an embodiment. The process illustrated in FIG. 8 starts from step S100 in response to an instruction to start a calibration process from a user.

In step S101, the image processing apparatus 110 sets 1 to a variable n for identifying a processing target, and sets N to the number of the projectors 150. Here, it is assumed that the number N is 2 or more.

In step S102, the first calibration projection scene is projected by outputting the first calibration image (including grid and alignment pattern) from the first projector. Here, in accordance with the guidance performed by the image processing apparatus 110, a user performs imaging such that the first calibration image projected by the first projector is included within the angle of view of the camera 160 and is shifted toward the right side. The guidance includes, for example, an instruction for a user to perform imaging such that a calibration image projected by the first projector is included within the angle of view of the camera 160 and is shifted toward the right side.

In step S103, a 2nth calibration projection scene is projected by outputting a first calibration image (including grid and alignment pattern) from the nth projector and outputting a second calibration image (including only the alignment pattern) from the (n+1)th projector. Here, in accordance with the guidance performed by the image processing apparatus 110, a user performs imaging such that a calibration image projected by the nth projector and a calibration image projected by the (n+1)th projector are included within the angle of view of the camera 160.

In step S104, the (2n+1)th calibration projection scene is projected by outputting the second calibration image (including only the alignment pattern) from the nth projector and outputting the first calibration image (including grid and alignment pattern) from the (n+1)th projector.

In step S105, whether the variable n to be processed has reached the number N−1 of combinations is determined. In step S105, when the variable n to be processed has not reached the number N−1 yet (NO), the process moves to step S106, the variable n is incremented by 1, and the process returns to step S103. By contrast, in step S105, when the variable n to be processed has reached the number N−1 of combinations (YES), the process moves to step S107.

In step S107, a 2Nth calibration projection scene is projected by outputting the first calibration image (including the grid and alignment pattern) from the Nth projector. Here, in accordance with the guidance performed by the image processing apparatus 110, a user performs imaging such that the first calibration image projected by the Nth projector is included within the angle of view of the camera 160 and is shifted toward the left side. For example, the guidance includes an instruction for a user to perform imaging such that a calibration image being projected by the Nth projector is included within the angle of view of the camera 160 and is shifted toward the right side.

In step S108, the image processing apparatus 110 collectively receives input of multiple captured calibration images from the camera 160, and the process moves to step S109. In the following description, it is assumed that multiple captured calibration images are collectively input, but the captured calibration images may be sequentially input for each imaging.

In step S109, though details will be described later, the image processing apparatus 110 executes a grid point extraction and integration process by the grid point extraction integrator 130. By the grid point extraction and integration process in step S109, sets of grid points of all the projectors 150 are obtained on the integrated coordinate system. In step S110, the image processing apparatus 110 calculates a geometric correction coefficient of each projector based on the grid point coordinates of the corresponding projector on the integrated coordinate system. In step S111, the image processing apparatus 110 calculates a blending coefficient of each projector.

In step S112, the image processing apparatus 110 sets, for each correction processor 114, the geometric correction coefficient and blending coefficient for each projector, which are calculated in steps S110 and Sill. In step S113, the image processing apparatus 110 causes the switching unit 122 to switch the input of the projection image output unit 116 to the output of the correction processor 114 to move to the projection mode.

In step S114, the image processing apparatus 110 reads the content image, and in step S115, a correction process is performed on the content image by the correction processor 114 for each projector. In step S116, the image processing apparatus 110 causes the projected image output unit 116 for each projector to output the corrected projected image for each projector to move to the normal mode in step S117.

Grid Point Extraction and Integration Process

Figure 9:
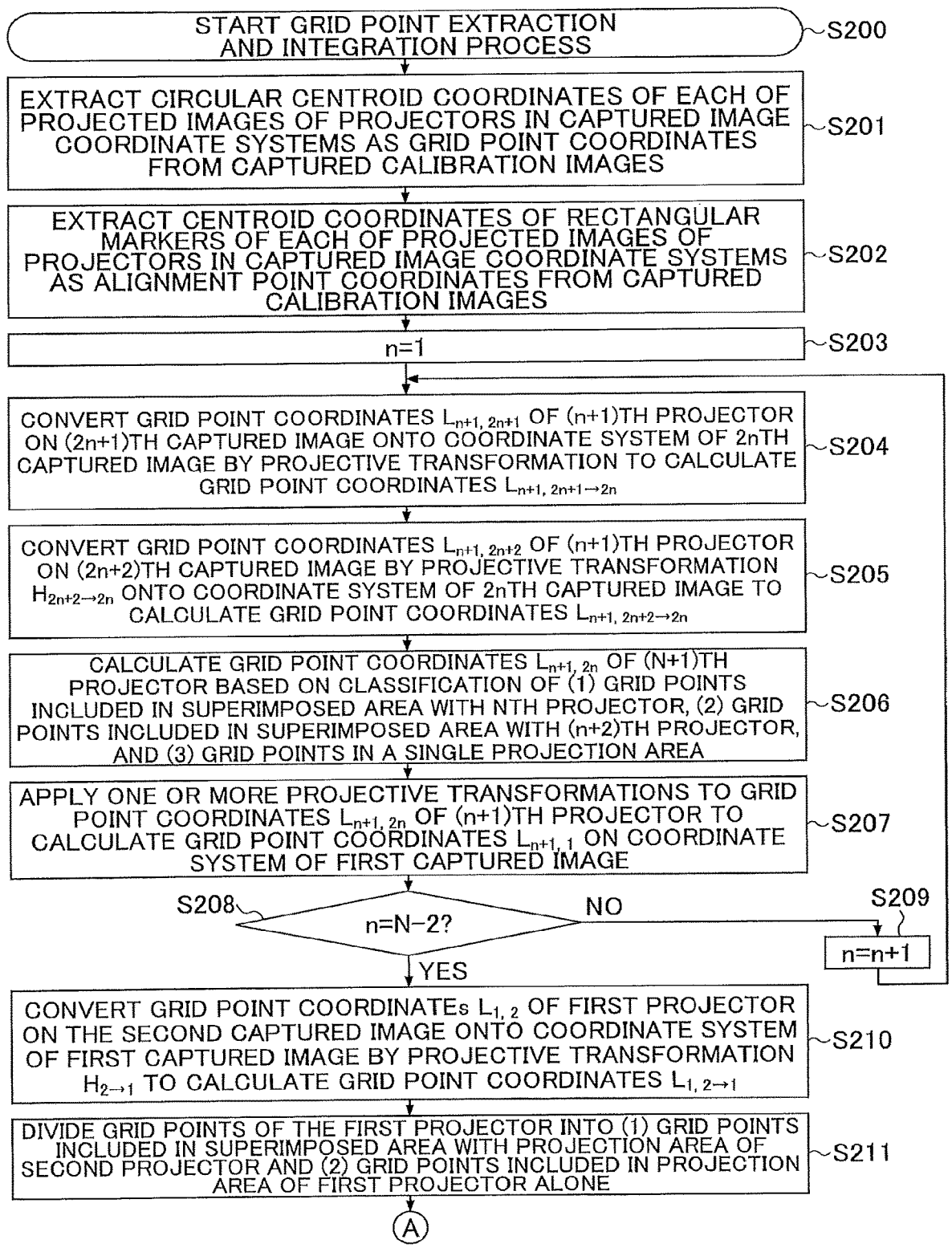
FIG. 9 is a flowchart illustrating a grid point extraction integrating process executed by a grid point extraction integrator according to an embodiment.
Figure 10:
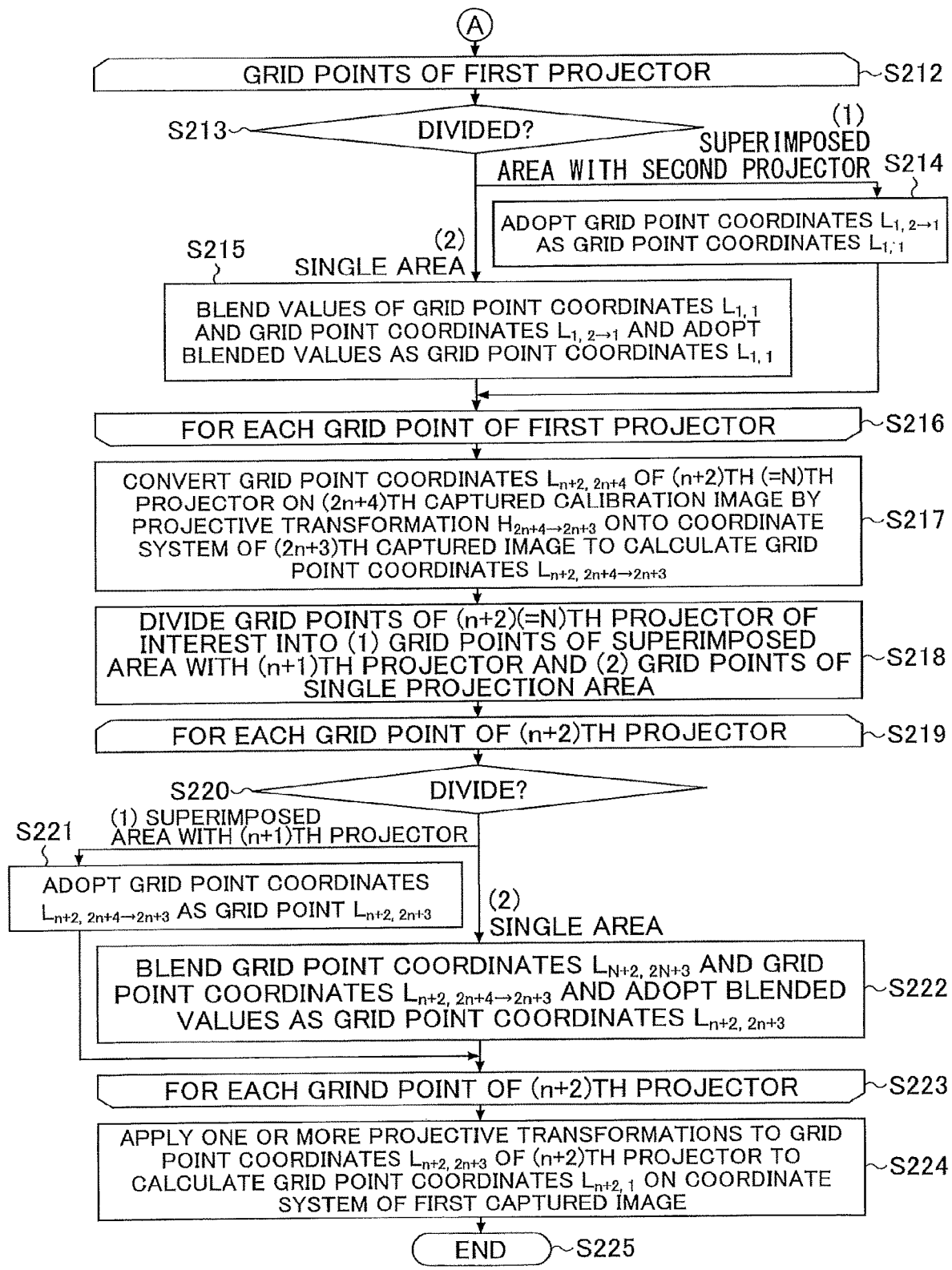
FIG. 10 is another flowchart illustrating a grid point extraction integrating process executed by the grid point extraction integrator according to an embodiment.

The following illustrates, with reference to FIG. 9 to FIG. 15, details of a grid point extraction and integration process for each projector. FIGS. 9 and 10 are flowcharts illustrating a grid point extraction and integration process executed by the grid point extraction integrator 130 according to this embodiment. The process illustrated in FIG. 9 is retrieved in step S109 illustrated in FIG. 8, and starts from step S200.

In step S201, the feature point extractor 132 extracts circular centroid coordinates of the projected images of the respective projectors in the respective captured image coordinate systems as grid point coordinates (decimal point precision) from the respective captured calibration images. For example, the circular centroid coordinates may be calculated by binarizing an image, cutting out a cluster of white pixels by pattern matching or the like, and obtaining the centroid coordinates thereof. In the calibration pattern illustrated in FIG. 3A, the grid point coordinates are calculated as an array of (x, y) coordinates for all grid points. Hereinafter, the grid point coordinates of the ith projector in the jth captured calibration image are represented by $L_{i,j}$.

In step S202, the feature point extractor 132 extracts the centroid coordinates of the rectangular markers of the projected images of the respective projectors in the respective captured image coordinate systems as alignment point coordinates from the respective captured calibration images. Similarly, centroid coordinates of a rectangular marker may be calculated, for example, by binarizing an image, cutting out a cluster of white pixels by pattern matching or the like, and obtaining the centroid coordinates thereof.

In step S203, the grid point extraction integrator 130 initializes a variable n for identifying a process target with 1. In steps S204 to S209, processing is performed on the second to N-Ith projectors 150 having adjacent projectors 150 one on each side.

Figure 11:
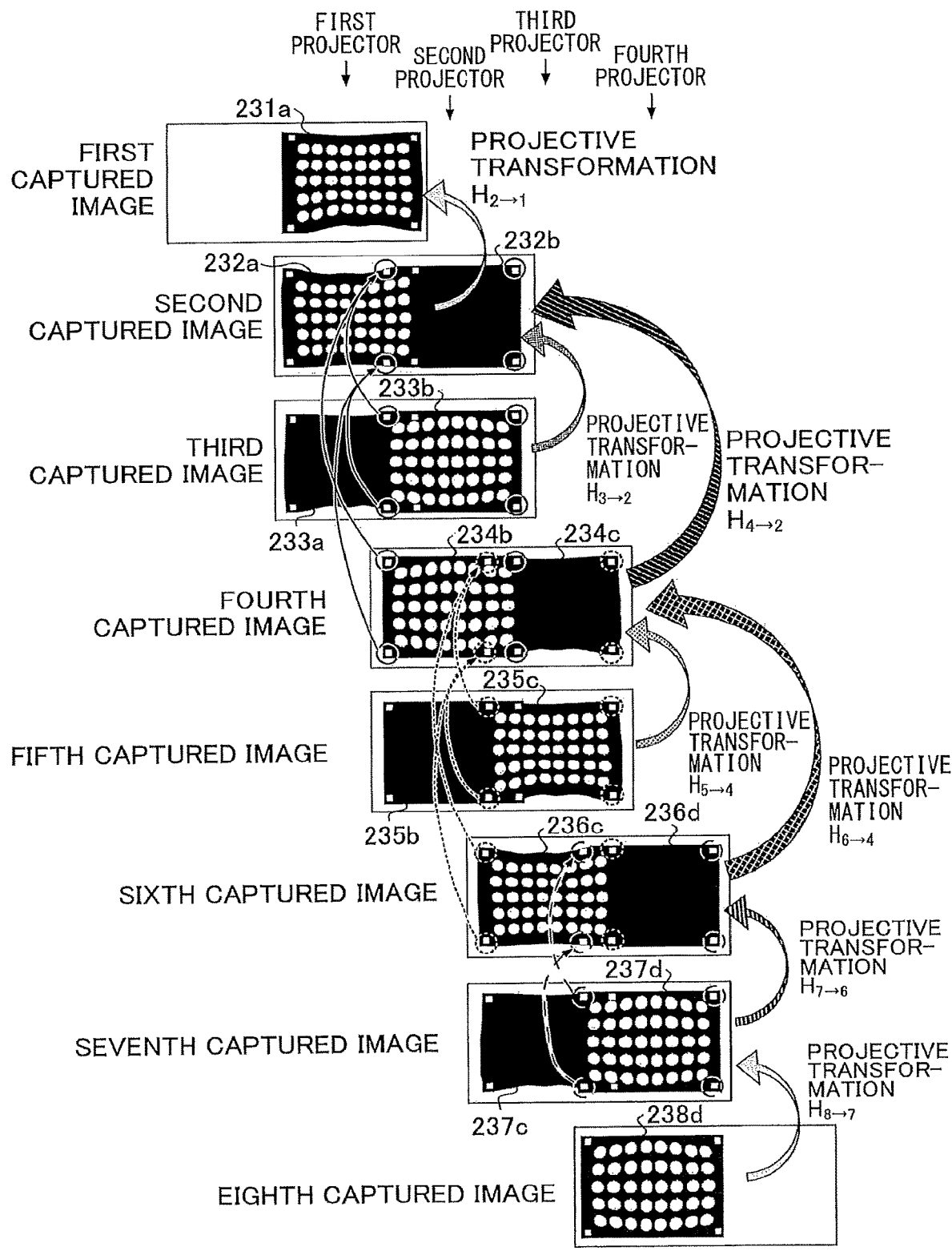
FIG. 11 is a diagram illustrating eight captured calibration images prepared by imaging respective calibration projection scenes, and projective transformation obtained between the captured calibration images.

FIG. 11 is a diagram illustrating eight captured calibration images prepared by capturing the calibration projection scenes, and projective transformation obtained in each of the captured images in the manner illustrated in FIGS. 6 and 7.

In step S204, the grid point converter 134 converts the grid point coordinates $L_{n+1,2n+1}$ of the (n+1)th projector on the (2n+1)th captured image onto the coordinate system of the 2nth captured image by projective transformation to calculate grid point coordinates $L_{n+1,2n+1 \to 2n}$. Hereinafter, the grid point coordinates of the ith projector extracted from the jth captured calibration image and converted onto the coordinate system of the kth captured image is represented by $L_{i,j \to k}$.

Here, the projective transformation indicates conversion from the coordinate system of the (2n+1)th captured image to the coordinate system of the 2nth captured image. The projective transformation that performs conversion from the coordinate system of the (2n+1)th captured image to the coordinate system of the 2nth captured image is represented by $H_{2n+1 \to 2n}$. The coefficients of the projective transformation $H_{2n+1 \to 2n}$ may be obtained based on a set of alignment points of the (n+1)th projector which commonly appears in the (2n+1)th and 2nth captured calibration images.

In step S205, the grid point convertor 134 converts the grid point coordinates $L_{n+1,2n+2}$ of the (n+1)th projector on the (2n+2)th captured image by the projective transformation $H_{2n+2 \to 2n}$ onto the coordinate system of the 2nth captured image to calculate grid point coordinates $L_{n+1,2n+2 \to 2n}$. The coefficients of the projective transformation $H_{2n+2 \to 2n}$ may be obtained based on a set of alignment points of the (n+1)th projector which commonly appears in the (2n+2)th and 2nth captured calibration images.

The following illustration is given, with reference to FIG. 11, of the second and third captured images as an example: that is, in the pair of the second and third captured images, the coordinates of the alignment points of the rectangular markers (indicated by a solid circle) that are common between the projected images 232b and 233b of the second projector 150b are obtained. In this case, the grid point converter 134 calculates the coefficient of the projective transformation $H_{3 \to 2}$ to be converted from the coordinate system of the third captured image to the second coordinate system based on this pair of the alignment point coordinates. Similarly, with respect to a pair of second and fourth captured calibration images, the grid point converter 134 calculates the coefficient of the projective transformation $H_{4 \to 2}$ to be converted from the coordinate system of the fourth captured image to the coordinate system of the second captured image, based on a pair of alignment point coordinates of rectangular markers (indicated by a solid circle) of projected images 232b and 234b of the second projector 150b.

Note that, with respect to the pair of the fourth and fifth captured images and the pair of the fourth and sixth captured calibration images, the grid point converter 134 similarly calculates the coefficient of the projective transformation based on the coordinates of the alignment points of the rectangular markers (indicated by a solid circle) that are common between the projected images 234c, 235c and 236c of the third projector 150c.

In step S206, the grid point combiner 136 divides the grid points of the (n+1)th target projector (projector of interest) into predetermined areas, and calculates grid point coordinates $L_{n+1,2n}$ according to the divided areas. More specifically, the grid point combiner 136 divides the grid points, among the grid points of the (n+1)th projector in the arrangement of projected images, into the following three categories: (1) grid points included in an area superimposed in the projection range of the nth projector positioned to the immediate left; (2) grid points included in an area superimposed in the projection range of the (n+2)th projector positioned to the immediate right; and (3) grid points included in a (single) projection area of only the (n+1)th projector and not included in any of the above two superimposed areas (1) and (2). Then, for each grid point of the (n+1)th target projector, coordinate values of each combined grid point are obtained based on the above divided categories.

The grid point combiner 136 adopts (1) grid point coordinates $L_{n+1,2n+1 \to 2n}$ calculated in step S204 as grid point coordinates $L_{n+1,2n}$, with respect to a grid point determined to be included in the superimposed area (n, n+1) with the nth projector positioned to the immediate left.

The grid point combiner 136 adopts (2) grid point coordinates $L_{n+1,2n+2 \to 2n}$ calculated in step S205 as grid point coordinates $L_{n+1,2n}$, with respect to a grid point determined to be included in the superimposed area (n+1, n+2) with the nth projector positioned to the immediate right.

The grid point combiner 136 blends the corresponding grid point coordinates $L_{n+1,2n+1 \to 2n}$ of the set calculated in the above step S204 with the corresponding grid point coordinates $L_{n+1,2n+2 \to 2n}$ of the set to calculate grid point coordinates $L_{n+1,2n}$ of the (n+1)th projector, with respect to (3) a grid point determined not to be included in the (n, n+1) or (n+1, n+2) areas respectively superimposed with the projection ranges of the nth projector and (n+2)th projector.

Figure 12A:
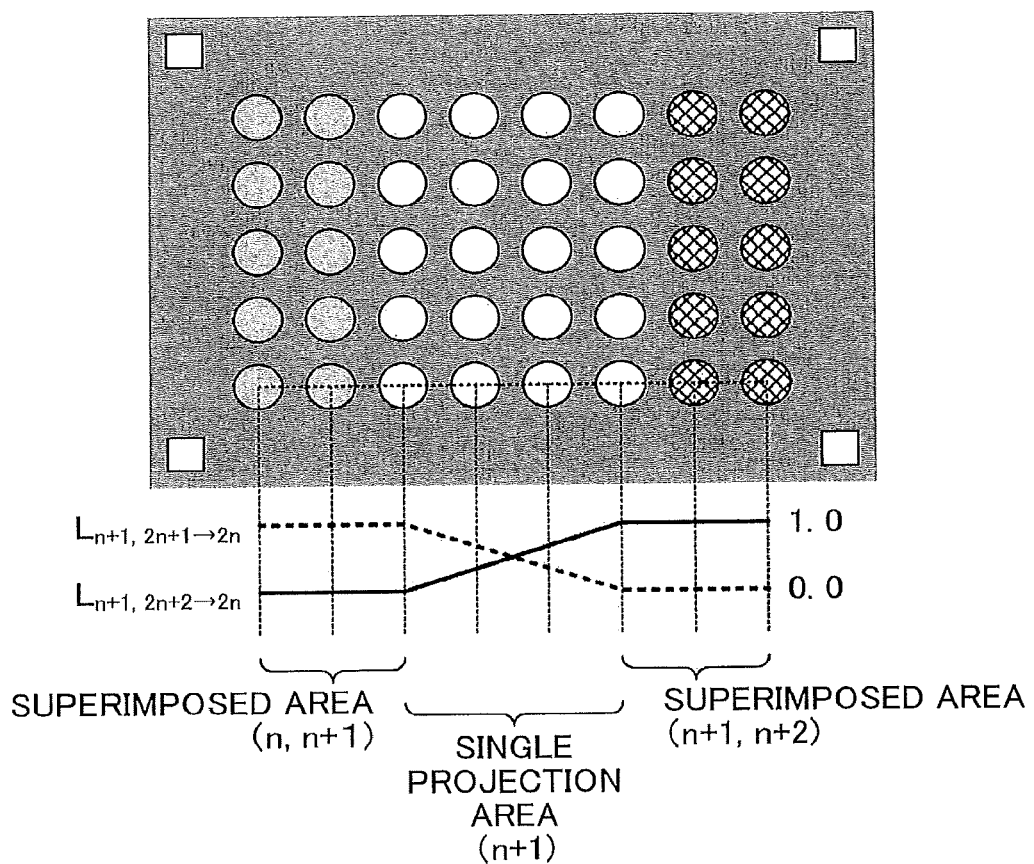
FIG. 12A is a diagram illustrating a blending (grid point combining) method of multiple sets of grid point coordinate values based on captured calibration images captured in different imaging ranges with respect to grid points of a target projector.

FIG. 12A is a diagram illustrating a blending method of multiple sets of grid point coordinate values based on captured calibration images captured in different imaging ranges with respect to grid points of the (n+1)th projector. As illustrated in FIG. 12A, with respect to the grid points included in the projection area of the single the (n+1)th projector, the corresponding grid point coordinates $L_{n+1,2n+1 \to 2n}$ of the set adopted in a superimposed area (n, n+1) and the corresponding grid point coordinates $L_{n+1,2n+2 \to 2n}$ of the set adopted in a superimposed area (n+1, n+2) that are blended according to position may be used as coordinate values.

In step S207, the grid point extraction integrator 130 applies one or more projective transformations to the grid point coordinates $L_{n+1,2n}$ of the (n+1)th projector to calculate grid point coordinates $L_{n+1,1}$ on the coordinate system of the first captured image, and then moves to step S208.

In step S208, the grid point extraction integrator 130 branches the process in accordance with whether a variable n specifying a process target has reached N−2 indicating the last projector having adjacent projectors one on each side. When the variable n has not reached N−2 (NO) yet in step S208, the variable n is incremented by 1 in step S209, and the process is looped to step S204. In this case, the process is repeated for the next target projector (a next projector of interest) that has adjacent projectors one on each side. When n has reached N−2 (YES) in step S208, the process moves to step S210.

In steps S210 to S216, a process of combining grid points for the first projector 150 is performed. In steps S217 to S224, a process of combining grid points for the last Nth projector 150 is performed. The following specifically illustrates a process of combining grid points in a case of a target projector being one of the first projector 150 and the last Nth projector 150, each of which has an adjacent projector on one side and no adjacent projector on the other side, with respect to the arrangement of the projected images along the horizontal direction which is substantially perpendicular to a direction of a curve.

In step S210, the grid point converter 134 converts the grid point coordinates $L_{1,2}$ of the first projector on the second captured image onto the coordinate system of the first captured image by projective transformation $H_{2 \to 1}$ to calculate grid point coordinates $L_{1,2 \to 1}$.

In step S211, the grid point combiner 136 divides the grid points of the first target projector into predetermined areas, and then moves to step S212 via a point A. More specifically, among grid points of the first projector, the grid point combiner 136 divides grid points into (1) grid points included in an area superimposed in the projection range of the second projector adjacently positioned on one side in the arrangement of projected images; and (2) grid points included in the projection area of the first projector alone.

Whether each grid point of the first target projector (first projector of interest) is included in the superimposed area (1, 2) with the second projector positioned to the immediate right is determined, based on whether each grid point coordinates $L_{1,2}$ of the first projector on the second captured image is included within an area surrounded by an outer peripheral edge obtained by extrapolation from grid point coordinates of the second projector on the third captured image transformed by the projective transformation $H_{3 \to 2}$.

In the loop from step S212 to step S216, coordinate values of a combined grid point for each of grid points of the first target projector are obtained based on the divided areas in step S211. In step S213, the grid point combiner 136 branches the process based on the divided areas.

In step S213, (1) when a grid point to be processed is determined to be included in the superimposed area (1, 2) with the second projector, the process moves to step S214. In step S214, the grid point combiner 136 adopts the grid point coordinates $L_{1,2 \to 1}$ calculated in step S210 as the grid point coordinates $L_{1,1}$ with respect to grid points that are superimposed on the projection range of the second projector. That is, for each of a set of grid points superimposed in the projection range of the second projector, coordinate values are calculated using the coordinate values of the grid points of the set in whichever one of the first and second calibration images is captured in the substantially same imaging range as the imaging range of the third projection image, which captures the calibration pattern of the adjacent second projector (i.e., the second captured calibration image).

In step S213, (2) when the grid point to be processed is determined not to be included in the superimposed area (1, 2) with the projection range of the second projector but to be included in a single projection area, the process moves to step S215. In step S215, the grid point combiner 136 blends the grid point coordinates $L_{1,1}$ and the corresponding grid point coordinates $L_{1,2\to 1}$ of the set calculated in the above step S210 to calculate grid points coordinates $L_{1,1}$ of the first projector, with respect to the grid points not superimposed in the projection range.

Figure 12B:
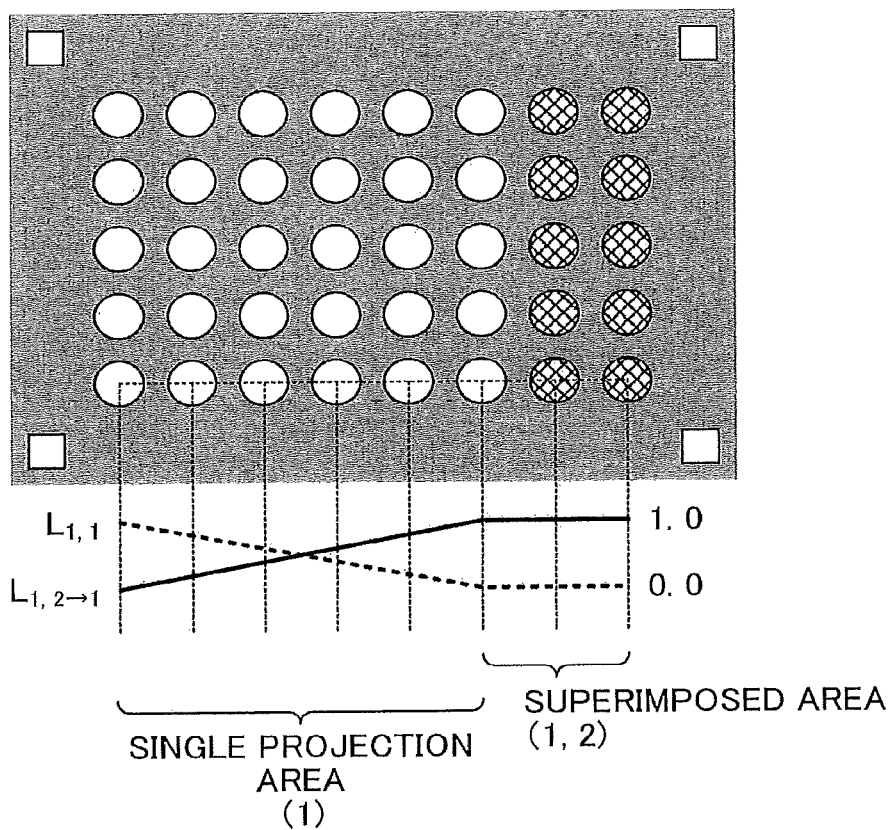
FIG. 12B is a diagram illustrating a blending (grid point combining) method of multiple sets of grid point coordinate values based on captured calibration images captured in different imaging ranges with respect to grid points of a target projector.

FIG. 12B is a diagram illustrating a blending method of multiple sets of grid point coordinate values based on captured calibration images captured in different imaging ranges, with respect to grid points of the first projector. As illustrated in FIG. 12B, with respect to grid points included in the projection area of the first projector alone, values obtained by blending the grid point coordinates $L_{1,1}$ and the corresponding grid point coordinates $L_{1,2\to 1}$ of the set adopted in the superimposed area (1, 2) according to position may be used. In this case, a single projection area is regarded from an end of the superimposed area to an end of the image, 0 is applied to one of the weights, and 1 is applied to the other weight at the each end of the image so as to perform a combining process of the set of grid point coordinates.

In the embodiment described, it is assumed that an image is linearly blended in accordance with a horizontal position of a grid point in an image without distortion. However, in consideration of distortion unique to a curved screen, different functional forms may be used. Further, in another embodiment, the same combining process as in FIG. 12A may be performed based on the existence of a virtually fixed overlapping portion.

In the loop of steps S212 to S216, when the blending process is completed for all grid points of the first projector, the grid points of the first projector are on the first image coordinate system which acts as a reference. Thus, the process is immediately performed on the last projector in step S217 and subsequent steps.

In step S217, the grid point convertor 134 converts the grid point coordinates $L_{n+2,2n+4}$ of the (n+2)th (=N) th projector on the last (2n+4)th captured calibration image by the projective transformation $H_{2n+4\to 2n+3}$ onto the coordinate system of the (2n+3)th captured image to calculate grid point coordinates $L_{n+2,2n+4\to 2n+3}$.

In step S218, the grid point combiner 136 divides the grid points of the (n+2) (=N)th target projector into predetermined areas. More specifically, among grid points of the (n+2)th (=N)th projector, the grid point combiner 136 divides (1) grid points included in an area superimposed in the projection range of the (n+1)th (N−1)th projector adjacently positioned on one side in the arrangement of projected images; and (2) grid points included in the single projection area of the (n+2)th (=N)th projector alone. Whether or not the grid point of the (n+2)th (=N)th target projector is included in the superimposed area (n+1, n+2) with the adjacent the (n+1)th (=N−1)th projector positioned to the immediate left may be determined in the same manner as described in the method for the first projector.

In the loop from step S219 to step S223, coordinate values of a combined grid point for each of grid points of the (n+2)th (=N)th target projector are based on the divided areas in step S218. In step S220, the grid point combiner 136 branches the process based on the divided areas.

In step S220, when the grid point to be processed is determined to be included in the superimposed area (n+1, n+2) with (1) the (n+1)th (=N)th projector, the process moves to step S221. In step S221, the grid point combiner 136 adopts the grid point coordinates $L_{n+2,2n+4\to 2n+3}$ calculated in step S217 as the grid point coordinates $L_{n+2,2n+3}$ with respect to grid points that are superimposed in the projection range of the (n+1)th projector.

In step S220, when the grid point to be processed is determined to be included in (2) the single projection area, the process moves to step S222. In step S222, the grid point combiner 136 blends the grid point coordinates $L_{n+2,2n+3}$ and the corresponding grid point coordinates $L_{n+2,2n+4\to 2n+3}$ of the set calculated in the above step S217 to calculate grid points $L_{n+2,2n+3}$ of the (n+2)th projector, with respect to the grid points not superimposed in the projection range.

In the loop of steps S219 to S223, when a process is completed for all grid points of the (n+2)th (=N)th projector, the process moves to step S224. In step S224, the grid point extraction integrator 130 applies one or more projective transformations to the grid point coordinates $L_{n+2,2n+3}$ of the (n+2)th (=N)th projector to calculate grid point coordinates $L_{n+2,1}$ on the coordinate system of the first captured image, and then moves to step S225 to end the process. As illustrated in FIG. 11, in a case of N=4 and n=2, for example, the grid point coordinates $L_{4,7}$ of the fourth projector converted onto the coordinate system of the seventh captured image are converted into the first grid point coordinate $L_{4,1}$ through the projective transformation $H_{7\to 6}$, the projective transformation $H_{6\to 4}$, the projective transformation $H_{4\to 2}$ and the projective transformation $H_{2\to 1}$.

As described above, the grid point coordinates of all the projectors 150a to 150d are converted and integrated onto, for example, the coordinate system of the first captured calibration image, so as to calculate grid point coordinates $L_{1,1}$ to $L_{N,1}$. Note that in the embodiment to be described, grid points are converted onto a common coordinate system that is common between multiple captured calibration images captured in different imaging ranges, and the grid points are then combined onto a single integrated coordinate system. However, the order of conversions is not particularly specified; hence, in other embodiments, grid points may be combined after being converted onto a single integrated coordinate system.

Figure 13:
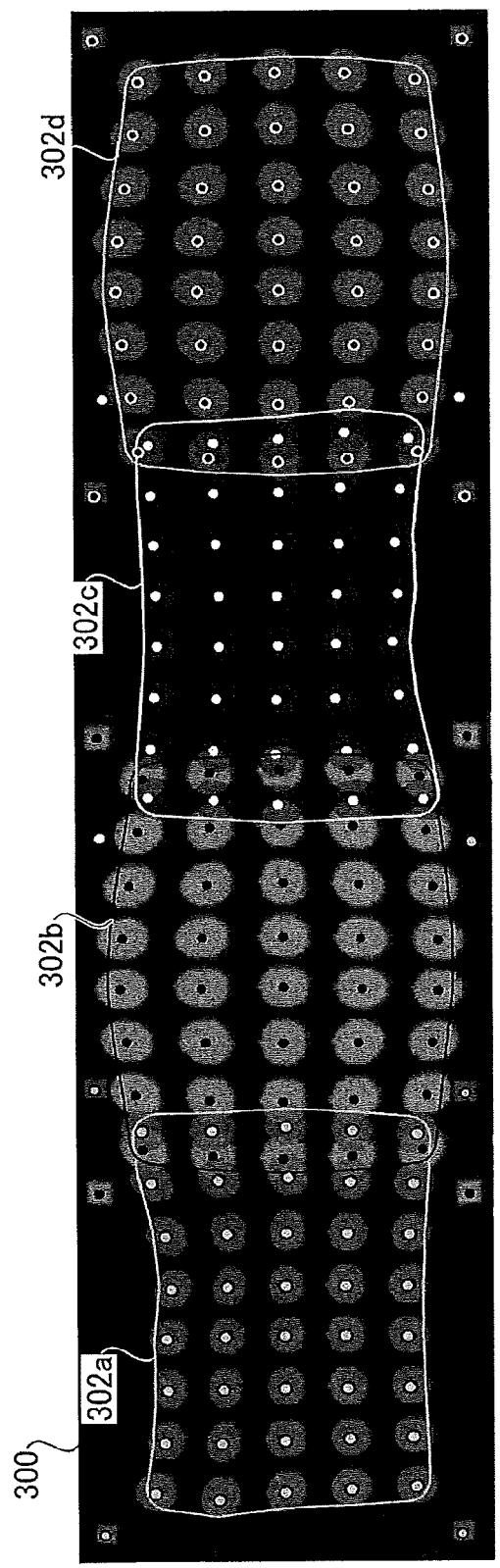
FIG. 13 is a diagram schematically illustrating sets of grid point coordinates of respective projectors that are integrated on an integrated coordinate system.

FIG. 13 is a diagram schematically illustrating respective sets of grid point coordinates of the projectors integrated onto an integrated coordinate system 300. As illustrated in FIG. 13, sets 302a, 302b, 302c, and 302d of grid point coordinates of the projectors are each converted and integrated onto the integrated coordinate system 300 of the first captured calibration image. FIG. 13 is a diagram illustrating a case where captured circular shapes of projected images projected by the projectors 150a to 150d are superimposed, but it is not necessary to superimpose the images themselves.

Effect of Division Imaging and Grid Point Combination

Figure 14:
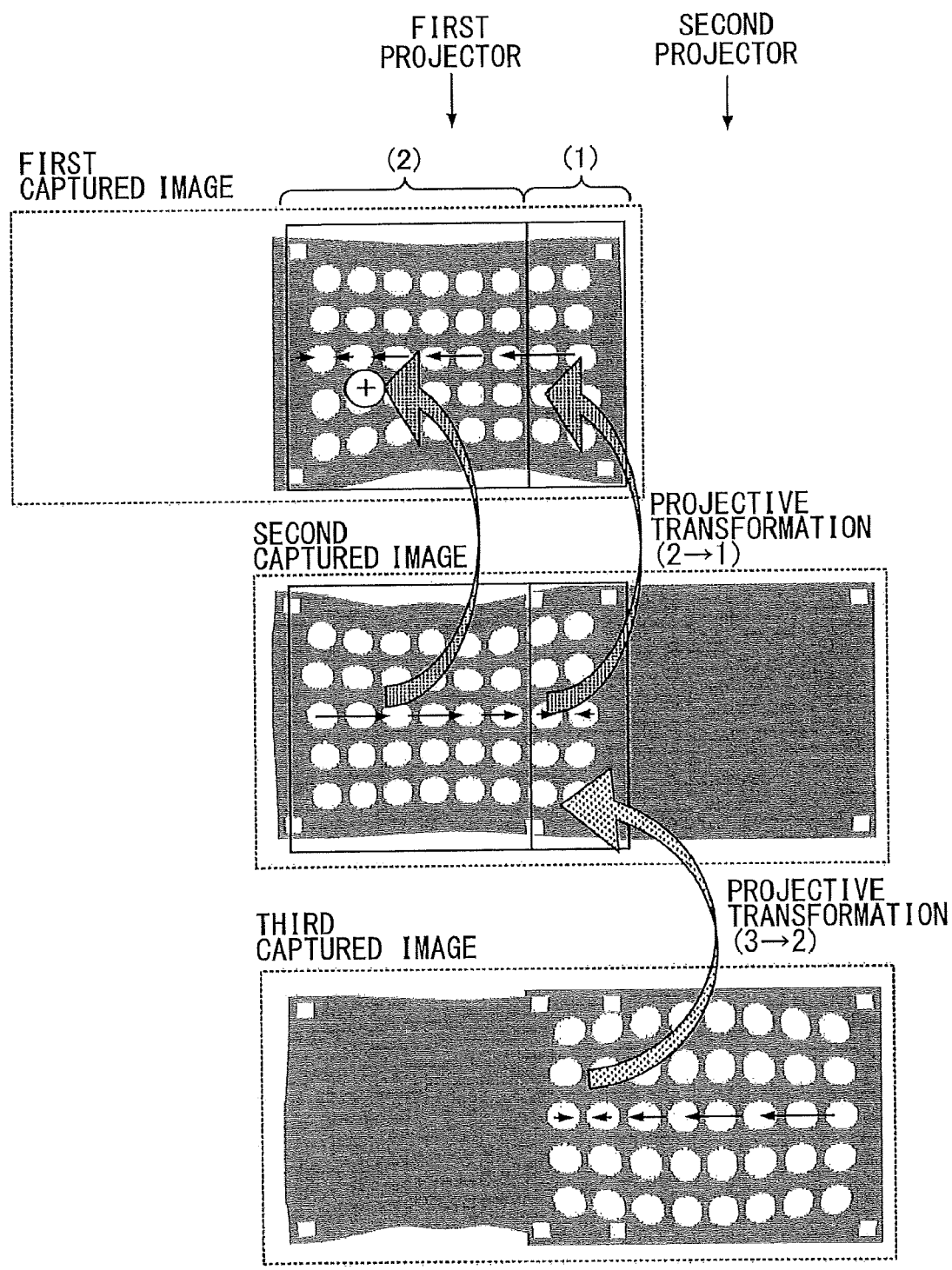
FIG. 14 is a diagram illustrating a process of combining multiple sets of grid points based on captured calibration images captured in different imaging ranges with respect to a projector positioned at the left end.

Hereinafter, with reference to FIG. 14 and FIG. 15, the effect of the division imaging and the subsequent process of combining the captured grid point coordinates will be examined. As illustrated in FIG. 14, with respect to the first projector 150a, the left end of the calibration projection image in the first captured image and the right end of the calibration projection image in the second captured image are located at the center of the field angle of the camera. The center of the field angle of the camera is an area with the least distortion against bobbin shaped distortion due to perspective transformation on a curved screen having a curve only in a vertical direction. Furthermore, distortion due to perspective transformation on the curved screen having a curve only in the vertical direction occurs only in the horizontal direction. The distortion increases as moving outward from the center of the lens, and is symmetrical in a direction of distortion. In FIG. 14, directions and magnitudes of the bobbin-shaped distortion due to perspective transformation on the curved screen are schematically indicated by arrows.

In step S214 described above, grid point coordinates $L_{1,2 \rightarrow 1}$ based on the second captured image calculated in step S210 are adopted for grid points determined to be included in the superimposed area (1). This is because, with respect to the grid points of the right side second projector based on the third captured image, grid point coordinates $L_{1,2 \rightarrow 1}$ based on the second captured image, which has substantially the same imaging range as that of the third captured image, may have less shift caused by distortion of the lens of the camera 160 than shift in the grid point coordinates $L_{1,1}$ based on the first captured image captured in an imaging range differing from that of the second captured image.

By contrast, in the above-described step S215, with respect to grid points in the single projection area (2) having no superimposed area in the projection range, the grid point coordinates $L_{1,1}$ and the corresponding grid point coordinates $L_{1,L2 \rightarrow 1}$ of the set calculated in the above step S210 are blended according to position.

In the embodiment, as illustrated in FIG. 14, the coordinate values $L_{1,1}$ and the coordinate values $L_{1,2 \rightarrow 1}$ having distortions in mutually opposite directions are blended such that those with less distortion are weighted with greater weight and those with larger distortion are weighted with smaller weight. Thus, bobbin-shaped distortion due to perspective transformation is eventually reduced. That is, with respect to an intermediate single projection area in addition to a portion located at the center of the field angle of the camera, the distortion of geometric correction is expected to be smaller than distortion corrected by using a single set of gird points from a single viewpoint.

Figure 15:
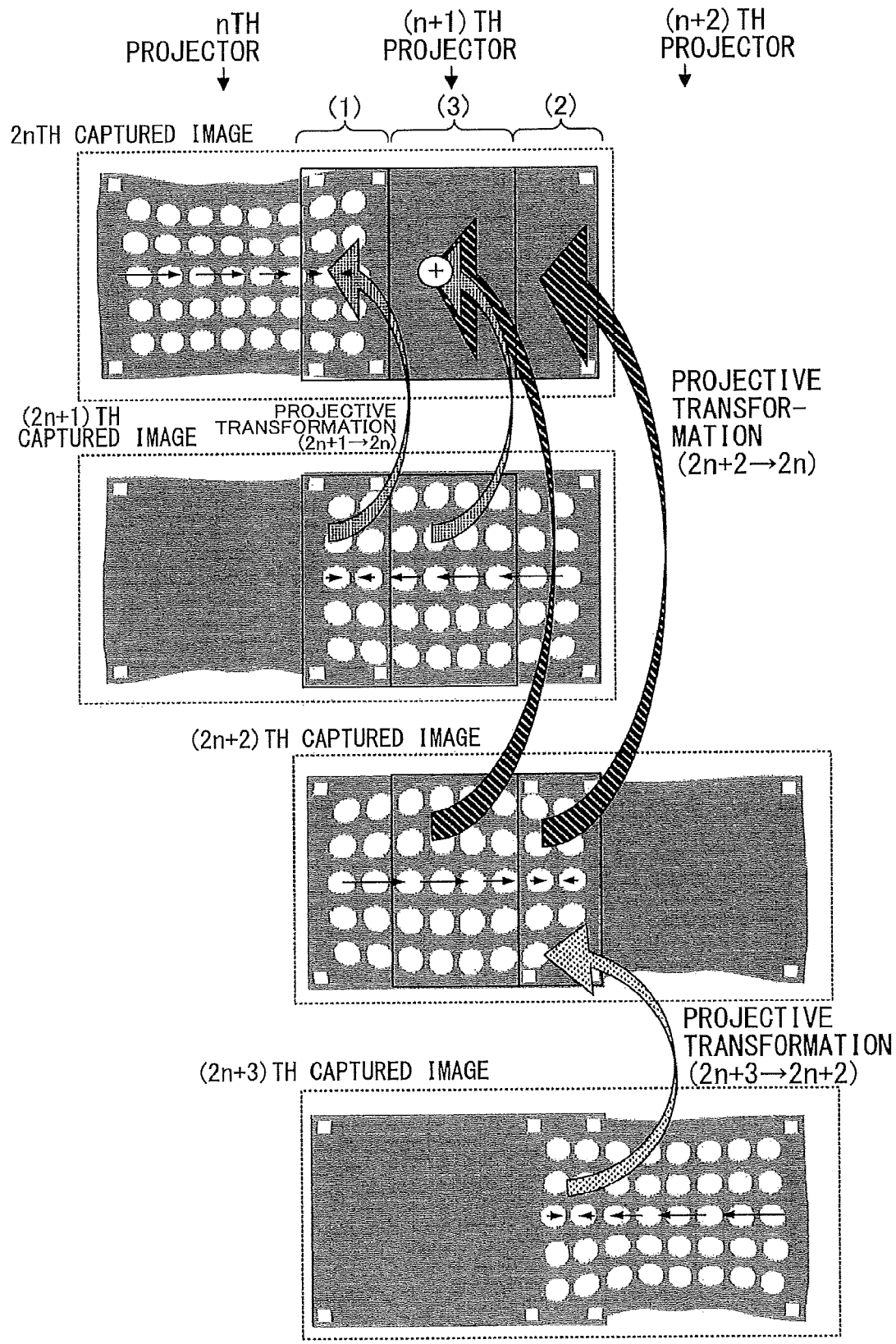
FIG. 15 is a diagram illustrating a process of combining multiple sets of grid points based on captured calibration images captured in different imaging ranges with respect to a projector having one projector on each side.

Similarly, FIG. 15 is a diagram illustrating a process of combining the grid point coordinates captured by a projector having projectors adjacent on both sides. With respect to a projector having adjacent projectors one on each side, as illustrated in FIG. 12A, in the single projection area (3) located between the superimposed areas (1) and (2), the coordinate values having distortion in opposite directions are blended such that the coordinate values with less distortion are weighted with greater weight and the coordinate values with greater distortion are weighted with smaller weight. Accordingly, with respect to an intermediate single projection area between superimposed areas in addition to the superimposed areas located at the center of the field angle of the camera, the distortion of geometric correction may be smaller than distortion corrected by using a single set of gird points from a single viewpoint.

As described above, by combining sets of grid points obtained from captured calibration images captured in different imaging ranges, bobbin-shaped distortion caused by perspective transformation by the camera 160 using a curved screen having a curve only in the vertical direction may be reduced. Even when multiple people view from viewpoints at various positions, it is possible to reduce a barrel-shaped distortion bulged at the left and right ends of the corrected projected image, thereby reducing an incongruent sense felt by a person. Since calibration is performed by using the captured calibration image obtained by imaging the calibration pattern at multiple viewpoints, it is possible to achieve correction equivalent to calibration using a calibration image close to an image obtained by parallel projection of a projected calibration pattern.

Note that the above-described embodiment is illustrated based on an example in which two captured calibration images captured in different imaging ranges are prepared for each of the projectors 150. However, the number of captured calibration images captured in different imaging ranges prepared for each of the projectors 150 is not limited to two, and three or more captured calibration images captured in different imaging ranges may be prepared for each of the projectors 150. In such a case, a set of grid points may be extracted from each of the captured calibration images and three or more sets of grid points may be combined according to position.

Correction Coefficient Calculation Process

Figure 16B:
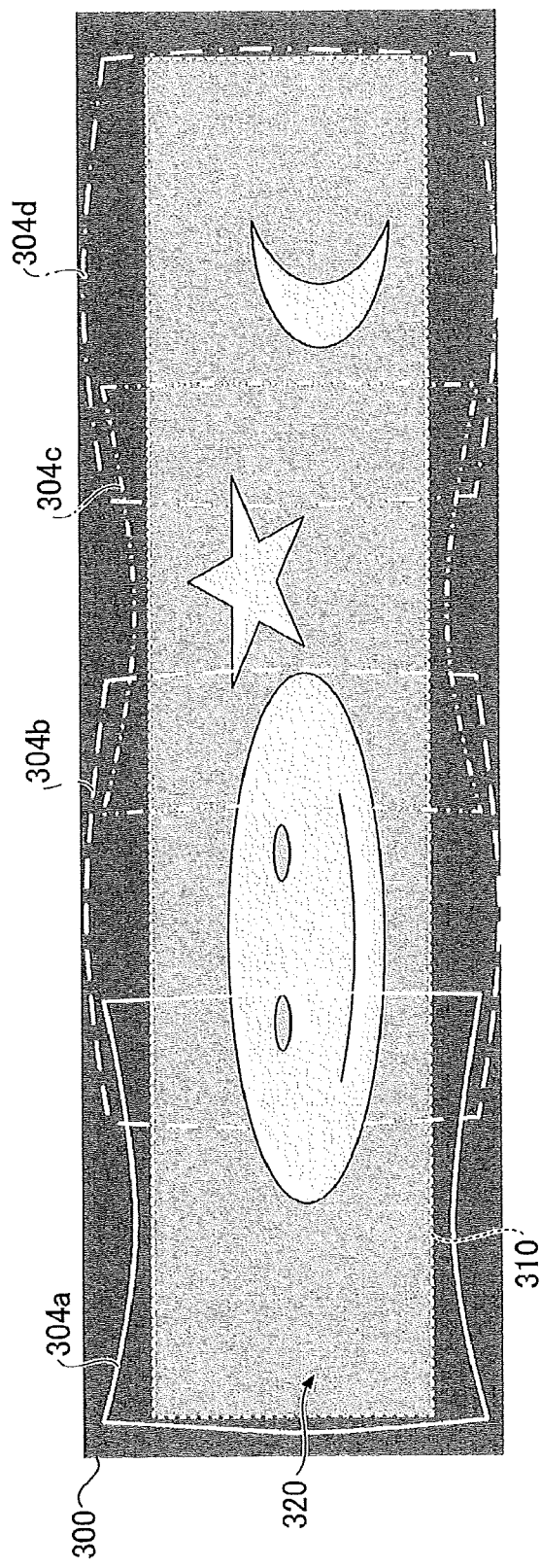
FIG. 16B is another diagram illustrating projection ranges of four projectors on an integrated coordinate system, a corrected projection target area, and a projection content image.

FIGS. 16A to 16B are diagrams illustrating projection ranges of the four projectors on the integrated coordinate system, a corrected projected target area, and a projection content image. Thereafter, the geometric correction coefficient calculator 142 sets a rectangular projection target area 310 on the integrated captured image coordinate system based on the sets of the combined grid points of all the projectors 150, and calculates a geometric correction coefficient for each projector such that the content image 320 to be projected is fixed to the projection target area 310.

FIG. 16A depicts projection ranges 304a to 304d of four projectors detected on the integrated coordinate system 300. The geometric correction coefficient calculator 142 obtains a logical OR (OR) of the projection ranges 304 of all the projectors on the integrated coordinate system, and sets a corrected projection target area 310 for mapping the content image within an area of the logical OR. The corrected projection target area 310 is set such that the content image is mapped to a maximum size within the area which is the logical OR of the projection ranges 304a to 304d of all the projectors while maintaining the aspect ratio of the content image.

The corrected projection target area 310 is an area allocated with the maximum size while maintaining the aspect ratio (e.g., M:N) of the content image within the rectangular area indicated by the dotted line in FIG. 16A. Then, as illustrated in FIG. 16B, the content image 320 to be projected is fixed to the corrected projection target area 310.

Figures 17B, 18A:
FIG. 17B is a diagram illustrating a data structure of a blending coefficient.
FIG. 18A is a diagram illustrating a pixel interval calibration process in a vertical direction in which a projection body has a curve according to an embodiment.

FIG. 17A illustrates a data structure of a geometric correction coefficient of one calculated projector. Pixel positions with respect to all the pixels on the projector-memory obtained are geometric correction coefficients, as illustrated in FIG. 17A. FIG. 17B illustrates the data structure of blending coefficients of one calculated projector. Blending coefficients with respect to all the pixels on the projector-memory are obtained as illustrated in FIG. 17B.

Note that calculation of geometric correction coefficients and calculation of blending coefficients may be performed in the same manners in a conventional manner, except for the point of a set of combined grid points being used; thus, a further illustration will be omitted. After the geometric correction coefficients and blending coefficients with respect to all the pixels are obtained, the correction process may also be performed in the same manner as a conventional manner; thus a further illustration will be omitted.

Vertical Scale

Through the calibration process described above, it is possible to perform calibration similar to calibration using a calibration image close to an image obtained by parallel projection of a calibration pattern; pixel intervals in the vertical direction are corrected such that a projected image is seen at correct pixel intervals when viewed from the camera viewpoint. The following illustrates a video projection system according to a preferred embodiment in which pixel intervals are improved (corrected) in a direction of a curved surface of a projection body. The calibration process according to this preferred embodiment may be preferably applied when the curvature of the screen is large.

In a preferred embodiment, in addition to the captured calibration image obtained by capturing the above-described calibration pattern, imaging is performed under the same imaging conditions as the imaging of the calibration pattern, such that a removable equal-interval scale (e.g. checker patterns) 250 fixed in the vertical direction onto the curved surface of the screen as illustrated in FIG. 18A is located at a position corresponding to the center of the angle of view of the camera 160. In this manner, it may be possible to prepare a captured image captured such that the physical scale fixed to the projection surface and extending in substantially the same direction as the direction of the curved screen is located at a position substantially in the center of the angle of view of the camera 160.

Figure 18B:
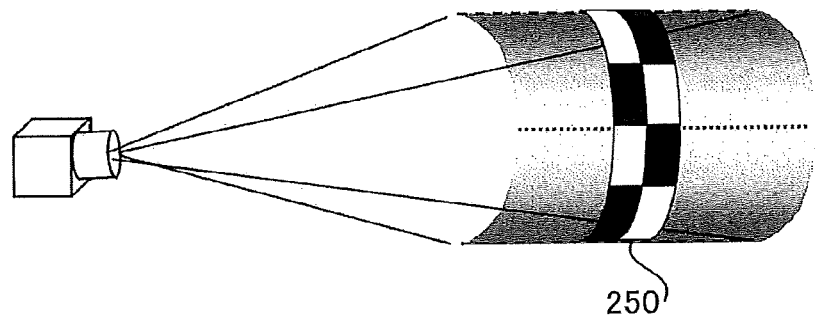
FIG. 18B is another diagram illustrating a pixel interval calibration process in a vertical direction in which a projection body has a curve according to an embodiment.
Figure 18C:
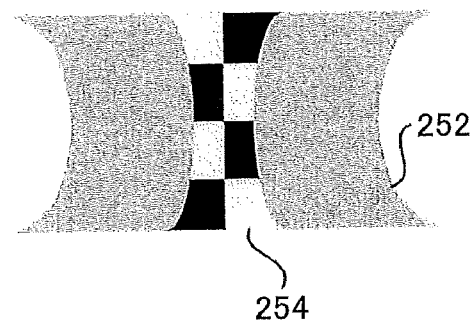
FIG. 18C is another diagram illustrating a pixel interval calibration process in a vertical direction in which a projection body has a curve according to an embodiment.
Figure 18D:
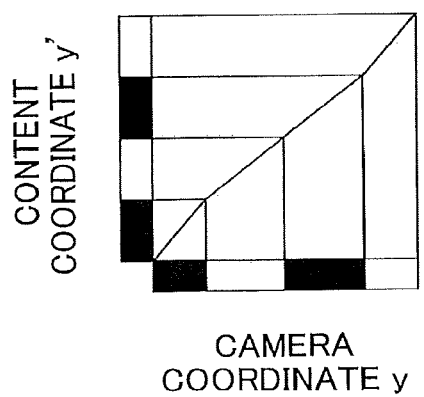
FIG. 18D is another diagram illustrating a pixel interval calibration process in a vertical direction in which a projection body has a curve according to an embodiment.

FIG. 18C is a diagram illustrating a curved screen image 252 and a physical scale image 254 imaged by the camera 160. The correction coefficient calculator 140 according to the preferred embodiment calculates one-dimensional correction information in the vertical direction defining the mapping from a y coordinate of the captured image (integrated coordinate system) of the camera to a y' coordinate of a content image, and calculates the geometric correction coefficient and blending coefficient by applying the coordinate correction based on the captured scale image. The one-dimensional correction information may be approximated by a piecewise linear function as illustrated in FIG. 18D if there is a physical scale having a certain degree of granularity. Further, in order to perform alignment on the integrated coordinate system described above, an image of the physical scale may be captured in a state where a second calibration image including the alignment pattern is projected from one projector 150.

As similar to a case where a horizontal cylindrical inner wall is used as a screen, when a curved surface that is curved only in the vertical direction has a uniform cross section in the horizontal direction, extension and contraction of pixel intervals in the vertical direction is constant. Therefore, the physical scale is measured with one of divided images at one place. By contrast, when a screen has a tapered shape such as an inner wall of a horizontal truncated cone used as a screen, one-dimensional correction information in the vertical direction at each horizontal position may be calculated by measuring a physical scale at multiple places to perform interpolation in the horizontal direction.

In the above-described preferred embodiment, a change in the pixel intervals in the vertical direction is measured on the physical scale. However, when the curvature of the curved surface screen is small, distortion may be ignored in the first place, so measurement with the physical scale may be performed optionally. Furthermore, when curve information on a vertical cross section of the screen and information on relative angles of the camera and the screen at the time of imaging are provided, one-dimensional correction information may be calculated from such information by simulation.

Image Projection System Including Single Projector

In the above-described embodiments, the video projection system mainly including two or more projectors has been described. The following illustrates a modification of a video projection system including a single projector.

Figure 19:
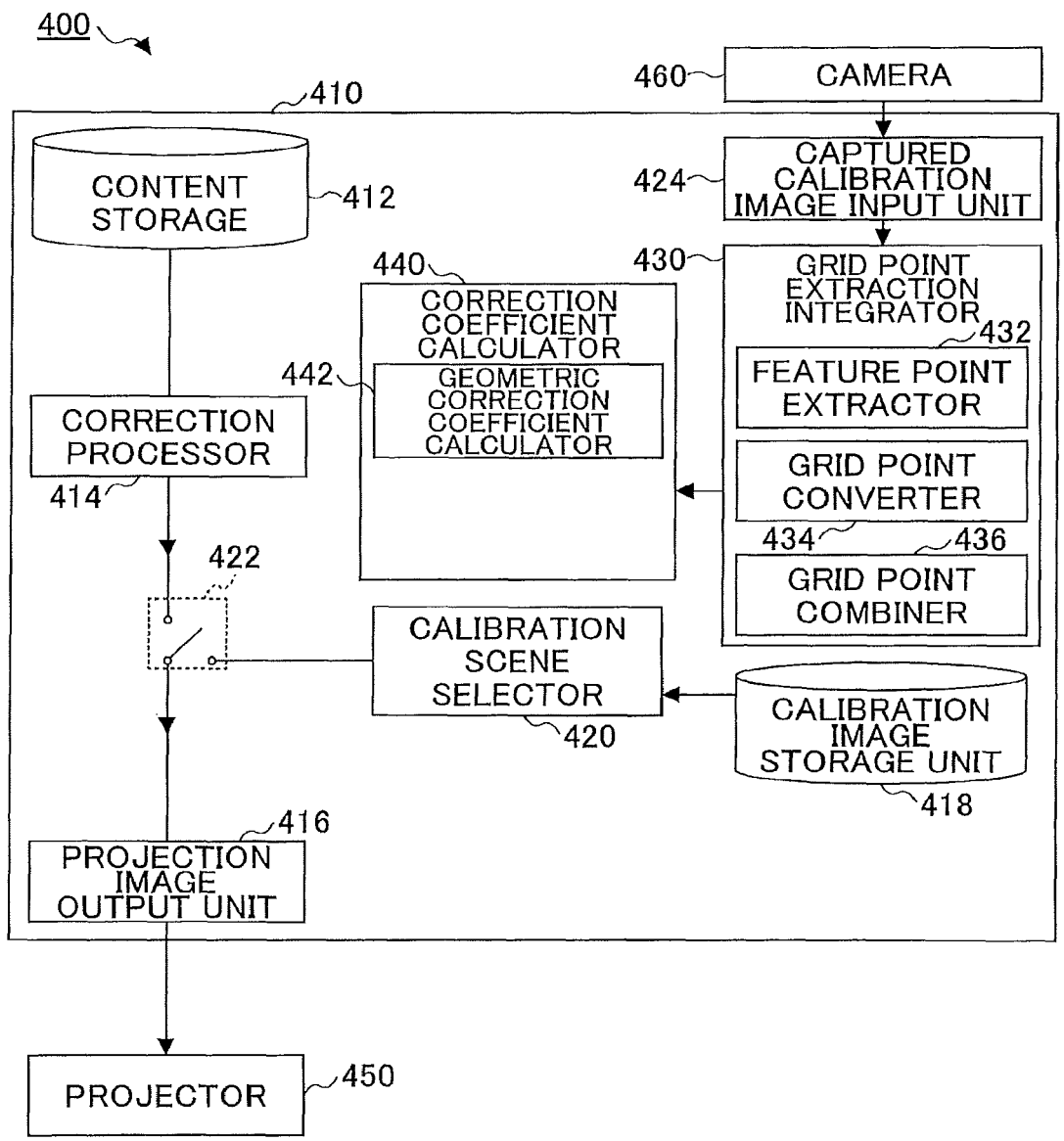
FIG. 19 is a functional block diagram illustrating a video projection system having one projector according to a modification.

FIG. 19 is a functional block diagram illustrating a video projection system 400 according to the modification. An image processing apparatus 410 illustrated in FIG. 19 includes a content storage unit 412, a correction processor 414, a projection image output unit 416, and a switching unit 422. The image processing apparatus 410 further includes a calibration image storage unit 418, a calibration scene selector 420, a captured calibration image input unit 424, a grid point extraction integrator 430, and a correction coefficient calculator 440.

More specifically, the grid point extraction integrator 430 includes a feature point extractor 432, a grid point converter 434, and a grid point combiner 436. More specifically, the correction coefficient calculator 440 includes a geometric correction coefficient calculator 442 configured to calculate a geometric correction coefficient.

The captured calibration image input unit 424 according to the modification prepares multiple captured calibration images obtained by capturing a calibration pattern projected on the screen by the projector 450 in different imaging ranges in relation to the curved direction of the screen. In this case, since there is only one projector 450, the captured calibration image input unit 424 may only prepare two captured calibration images captured in different imaging ranges in which a viewpoint is shifted in a direction substantially perpendicular to the curved direction. The feature point extractor 432 extracts feature points from each of the prepared captured calibration images. The grid point converter 434 converts, as a preprocess of combination, multiple sets of grid points in the different imaging ranges onto a common coordinate system with respect to the projector 450. Conversion of coordinates is performed based on the above-described alignment points. In the modification, since there is only one projector 450 and two captured calibration images are obtained, grid points on a single integrated coordinate system may be obtained by conversion of the sets of the grid points captured in different imaging ranges onto the common coordinate system.

The grid point combiner 436 combines multiple sets of grid points based on the images captured in the different imaging ranges and converted onto the common coordinate system by the grid point converter 434, and generates sets of combined grid points with respect to the projector 450. In this case, a set of grid point coordinates may be combined as follows; a single projection area is defined as an area from one image end to the other image end, and weighting is performed such that one weight is 0 and the other is 1 at one image end, and one weight is 1 and the other is 0 at the other image end.

Video Projection System for Executing Calibration Process Based on Extrapolation Prediction Result According to the above-described configuration, a projection system for projecting an image on a projection object having a curve in one direction using one or more projection units is enabled to correct the projected image in consideration of observation from multiple viewpoints.

Specifically, when an image is projected by using an ultrashort focus projector onto a projection body having a curved surface in one direction such as a screen composed of a horizontal cylinder inner wall, correction accuracy deteriorates in an outside area where the calibration pattern does not exist. Although it is possible to project an image within an area where the calibration pattern exists, a portion corresponding to the outside area of the calibration pattern of the projected image will not be effectively used. Therefore, it is also desired to perform calibration with high accuracy, in the area where the calibration pattern exists and also in the outside area where no calibration pattern exists. The following other embodiments are given to meet such technical demands.

The following illustrates other embodiments with reference to FIGS. 20 to 25C, which include duplicated parts with the embodiments illustrated in FIGS. 1 to 17B. Thus, only the differences will be mainly described below. Note that elements having the same functions as those of the embodiments illustrated in FIGS. 1 to 17B are denoted by the same reference numerals.

The overall configuration of other embodiments described is similar to the embodiment described with reference to FIG. 1; however, in the following other embodiments, a short focus projector may be used as the projector 150, and more preferably, an ultrashort focus projector capable of super close projection may be used.

Figure 20:
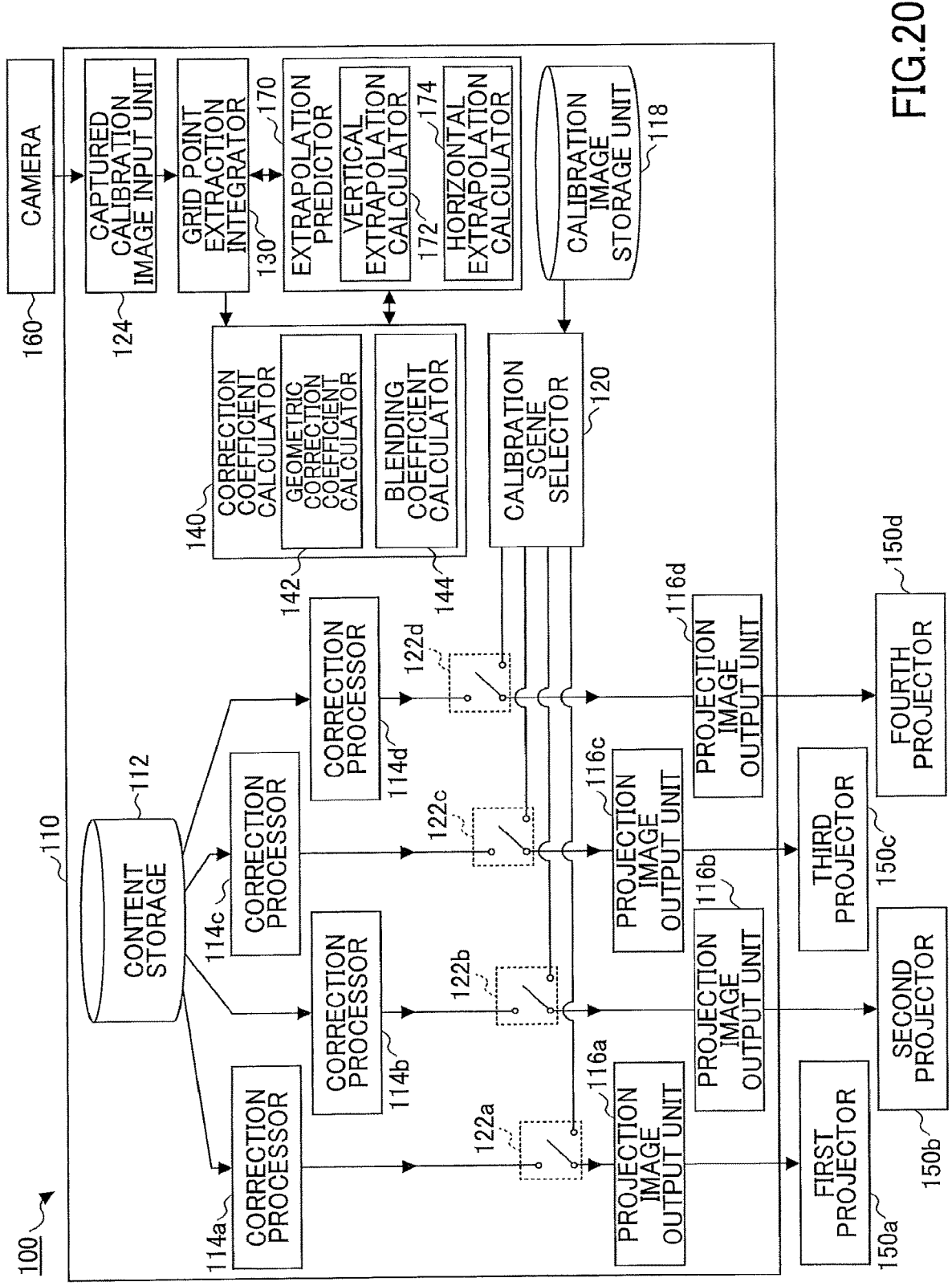
FIG. 20 is a functional block diagram illustrating a video projection system according to another embodiment.

FIG. 20 is a functional block diagram illustrating a video projection system 100 according to the modification. The video projection system 100 illustrated in FIG. 20 includes multiple functional blocks that operate on the image processing apparatus 110. The image processing apparatus 110 includes an extrapolation predictor 170, in addition to a content storage unit 112, per-projector correction processors 114a to 114d, per-projector projection image output units 116a to 116d, per-projector switching units 122a to 122d, a calibration image storage unit 118, a calibration scene selector 120, a captured calibration image input unit 124, a grid point extraction integrator 130, and a correction coefficient calculator 140, which function similar to those illustrated in FIG. 2.

The calibration projection scenes and a method of imaging the calibration projection scenes are similar to those illustrated in FIGS. 6 and 7. As illustrated in FIGS. 6 and 7, in the following other embodiment, the number of calibration projection scenes is prepared to correspond to a number of imaging times that is twice the number of projectors 150. The calibration projection scenes each include the first calibration image 200 illustrated in FIG. 3A projected from one target projector 150 (projector of interest). While the first calibration image 200 illustrated in FIG. 3A is being projected from one target projector 150 (projector of interest), other projectors 150 project none or a projector adjacent to the target projector projects the second calibration image 210 illustrated in FIG. 3B. In the imaging of each calibration projection scene, as illustrated in FIG. 6 and FIG. 7, an imaging position of the camera 160 is moved such that the camera 160 performs imaging while shifting each of the different imaging ranges between combinations of the projectors (a first projector alone, first and second projectors, second and third projectors, third and fourth projectors, and a fourth projector alone).

The following illustrates by referring back to FIG. 20. The grid point extraction integrator 130 extracts feature points from the captured calibration image prepared corresponding to the calibration projection scene and integrates the extracted feature points on a single coordinate system. Note that the extracted feature points may include grid points corresponding to a calibration pattern 206 for detecting distortion of a projected image, and alignment points corresponding to alignment patterns 202 and 212. The coordinates of the feature points are obtained by calculating the centroid of each graphic element on the captured image. The coordinates of the grid points define the correspondence between the coordinates on the projector memory and the coordinates on the coordinate system of the captured image by the camera 160. The coordinates of the alignment point are used as a reference for alignment between sets of the coordinates of the calibration images and for integrating the sets of the coordinates on the coordinate system of a single captured image. The grid point extraction integrator 130 constitutes an extractor in another embodiment.

In the examples illustrated in FIGS. 6 and 7, multiple sets of grid points in different imaging ranges are obtained for each target projector 150 (projector of interest). Therefore, in the preferred embodiment, the grid point extraction integrator 130 is enabled to execute a process of combining multiple sets of grid points as in the above-described embodiments. By combining the grid points, it is possible to reduce relative positional misalignment in the superimposed area between adjacent projectors 150 in geometric correction and distortion due to projection performed onto a projection body having a curve in one direction.

The extrapolation predictor 170 predicts coordinates of a grid point extrapolated to an outer portion (hereinafter, a grid to be extrapolated may be referred to as an extrapolation grid point) of a grid point corresponding to the calibration pattern 206 (hereinafter, the grid point to be actually measured may be referred to as an actually measured grid point). More specifically, the extrapolation predictor 170 includes a vertical extrapolation calculator 172 and a horizontal extrapolation calculator 174.

The vertical extrapolation calculator 172 calculates coordinates of the extrapolated grid points to be extrapolated in the vertical direction by a quadratic or higher-order function form, based on coordinates of actually measured grid points aligned in the vertical direction in which the screen 102 has a curve. The vertical extrapolation calculator 172 calculates coordinates of the extrapolation grid points in each of the upward and downward directions.

The horizontal extrapolation calculator 174 calculates coordinates of the grid points extrapolated in the horizontal direction based on the coordinates of multiple grid points aligned in the horizontal direction differing from the vertical direction in which the screen 102 has a curve. The horizontal extrapolation calculator 174 may typically calculate the coordinates of grid points extrapolated in the horizontal direction by a linear function of linearity. The horizontal extrapolation calculator 174 calculates coordinates of the extrapolation grid points in each of the leftward and rightward directions.

The vertical extrapolation calculator 172 and the horizontal extrapolation calculator 174 include a first direction calculator and a second direction calculator in the other embodiments. Note that in other embodiments to be described, the screen 102 has a curve in the vertical direction, with respect to which the vertical extrapolation calculator 172 calculates coordinates of the extrapolation grid points by the quadratic or higher-order function form. However, in yet another embodiment in which the screen 102 has a curve in a horizontal direction, the horizontal extrapolation calculator 174 calculates coordinates of the extrapolation grid points by the quadratic or higher-order function form.

The prediction result of the coordinates of the extrapolated grid points by the extrapolation predictor 170 is provided to the grid point extraction integrator 130 and the correction coefficient calculator 140. The prediction result of the extrapolation grid point is used when the grid point extraction integrator 130 combines grid points, and when the correction coefficient calculator 140 calculates a geometric correction coefficient and a blending correction coefficient.

The correction coefficient calculator 140 calculates various correction coefficients to be set for the correction processors 114a to 114d based on the grid points (including measured grid points and extrapolation grid points) for the obtained respective projectors 150.

In the embodiment illustrated in FIG. 20, the functional units 112 to 144 and 170 to 174 are described as being implemented on a single image processing apparatus 110, but embodiments of the video projection system 100 are not limited to the embodiment illustrated in FIG. 20. In still another embodiment, the functional units 112 to 144 and 170 to 174 may be distributed across the multiple image processing apparatuses, all of the functional units 112 to 144 and 170 to 174 may be mounted on any of the projectors 150, or the functional units 112 to 144 and 170 to 174 may be configured to be mounted on a single apparatus including the functions of the image processing apparatus 110 and the functions of the multiple projectors 150. Further, in another embodiment, part of or all of the functions of the grid point extraction integrator 130, the extrapolation predictor 170, and the correction coefficient calculator 140 may be implemented as a server that provides services via a network.

Figure 21:
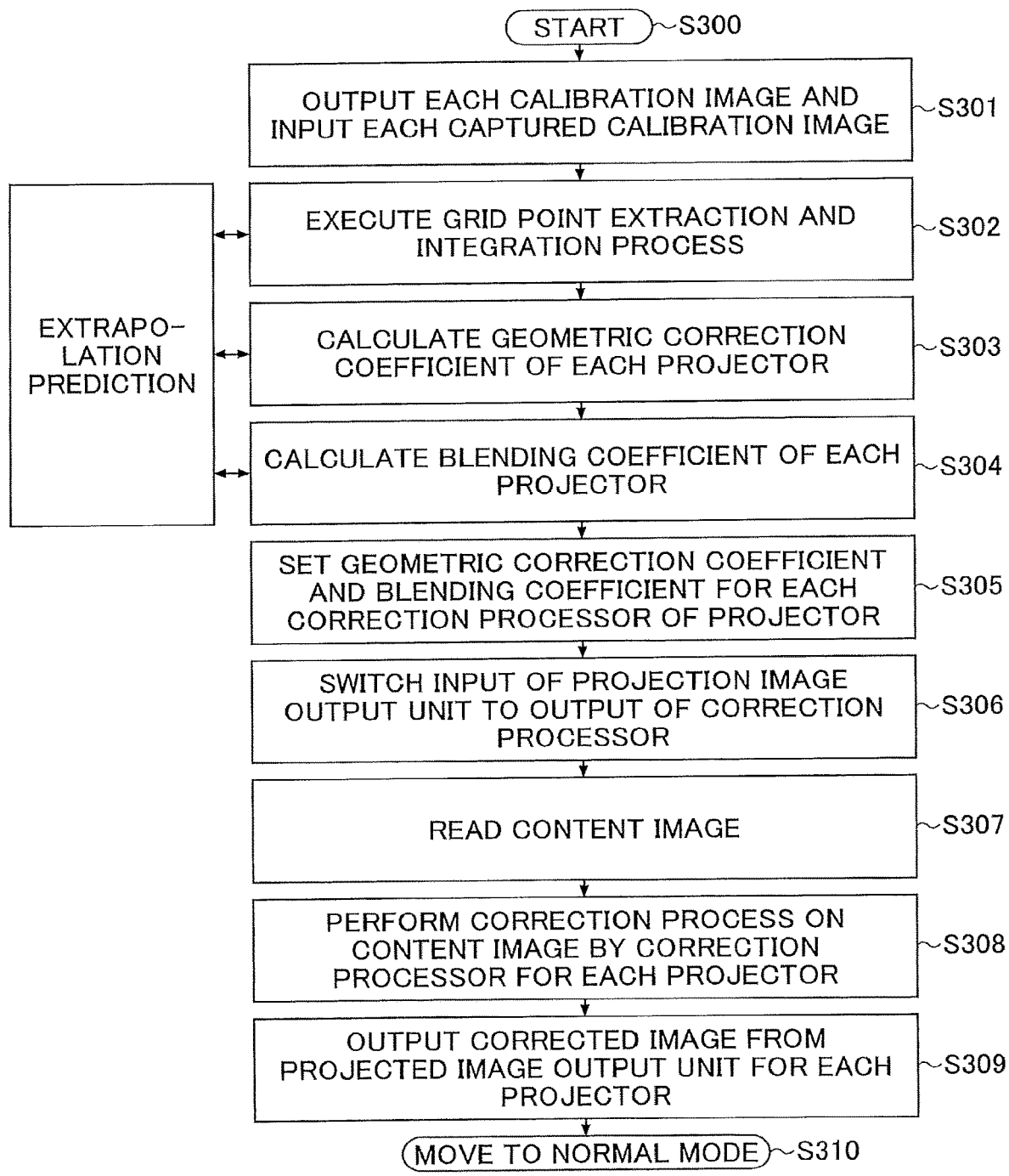
FIG. 21 is a flowchart illustrating an overall calculation process of various correction coefficients and a correction process based on correction coefficients.

The following illustrates an overall correction process with reference to FIG. 21. FIG. 21 is a flowchart illustrating an overall process of a grid point extraction integrating process, a various correction coefficients calculating process, and a correction process based on correction coefficients, according to another embodiment. The process illustrated in FIG. 21 starts from step S300 in response to an instruction to start a calibration process from a user.

In step S301, the image processing apparatus 110 causes the respective projectors 150 to output calibration images corresponding to the calibration projection scenes, and receives an input of a calibration image captured by the camera 160 corresponding to each calibration projection scene. In this case, it is assumed that multiple instances of projections are performed corresponding to multiple calibration projection scenes as illustrated in FIG. 6 and FIG. 7, and that a user performs imaging multiple times according to the guidance performed by the image processing apparatus 110, for example. The image processing apparatus 110 may collectively receive inputs of multiple captured calibration images after imaging of all the calibration scenes has been completed, or may receive inputs of multiple captured calibration images sequentially every time the corresponding calibration scene is imaged. Details of the projection and imaging of the calibration projection scenes are omitted.

In step S302, the image processing apparatus 302 executes a grid point extraction and integration process by the grid point extraction integrator 130. Note that for combining sets of grid points of the same projector 150 belonging to different captured calibration images, the extrapolation prediction result obtained by the extrapolation predictor 170 may be referred to. By the grid point extraction and integration process in step S109, sets of grid points of all the projectors 150 are obtained on the integrated coordinate system.

In step S303, the image processing apparatus 110 calculates a geometric correction coefficient of each projector based on the grid point coordinates of the corresponding projector on the integrated coordinate system. In step S304, the image processing apparatus 110 calculates a blending coefficient of each projector based on the grid point coordinates of the corresponding projector on the integrated coordinate system. Note that for calculating the geometric correction coefficient and the blending coefficient, the extrapolation prediction result obtained by the extrapolation predictor 170 may be referred to.

In step S305, the image processing apparatus 110 sets, for each correction processor 114, the geometric correction coefficient and blending coefficient for each projector, which are calculated in steps S303 and S304. In step S306, the image processing apparatus 110 causes the switching unit 122 to switch the input of the projection image output unit 116 to the output of the correction processor 114 to move to the projection mode.

In step S307, the image processing apparatus 110 reads the content image, and in step S308, the image processing apparatus 110 executes a correction process on the content image by the correction processor 114 for each projector. In step S309, the image processing apparatus 110 causes the projected image output unit 116 for each projector to output the corrected projected image for each projector, and then move the mode to the normal mode in step S310.

In the other embodiment illustrated in FIG. 21, an example is illustrated in which the mode is moved to the normal mode after performing the corrections once. However, the other embodiment illustrated in FIG. 21 is not limited to this example. In the other embodiment illustrated in FIG. 21, before shifting to the normal mode, the positions of the four corners of the target projection area on which the content image is projected may be adjusted so as to match the four corners of the screen 102.

Extrapolation Prediction Process

Figure 22:
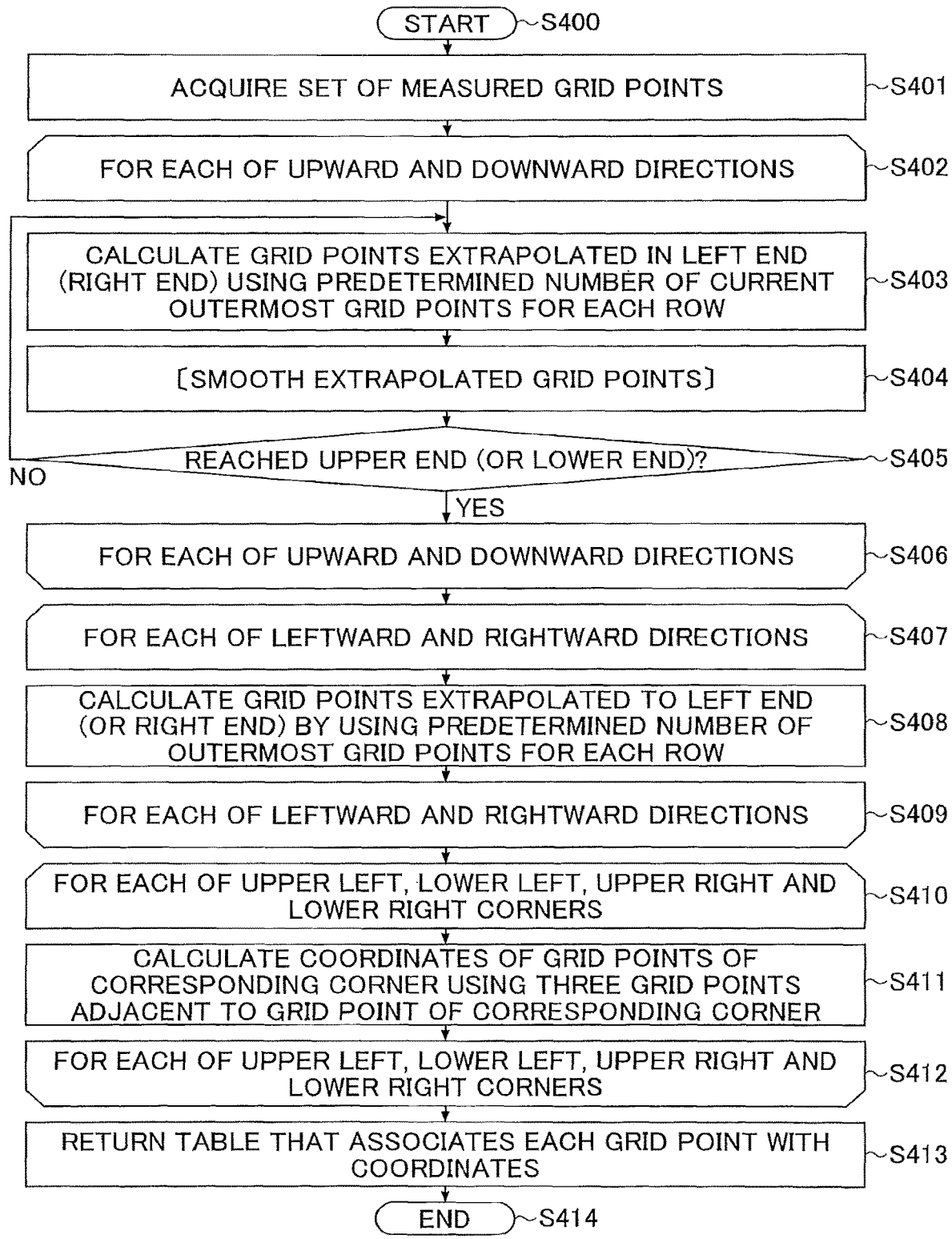
FIG. 22 is a flowchart illustrating an extrapolation prediction process executed by an image processing apparatus in a video projection system according to another embodiment.
Figure 23A:
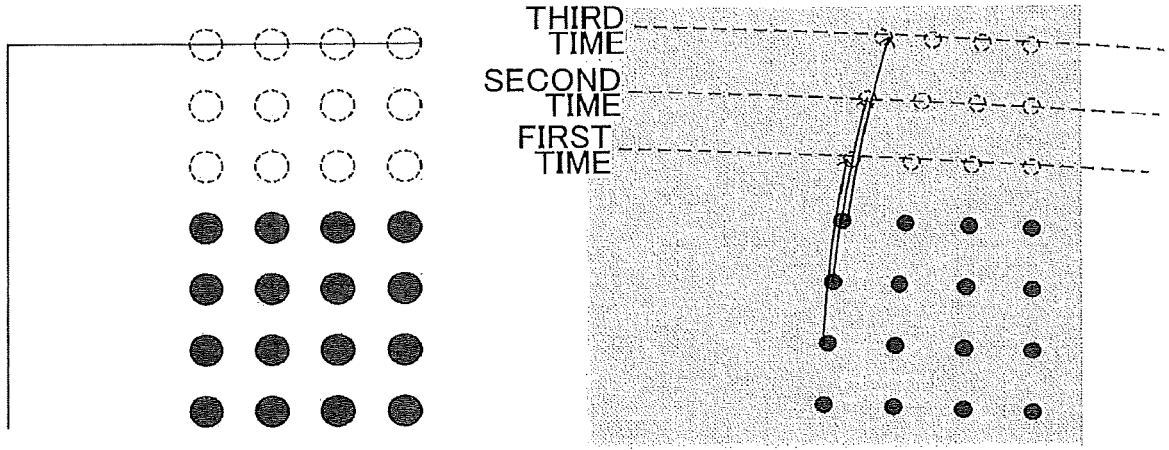
FIG. 23A is a diagram illustrating a process at each stage of an extrapolation prediction process executed by an image processing apparatus in a video projection system according to another embodiment.
Figure 23B:
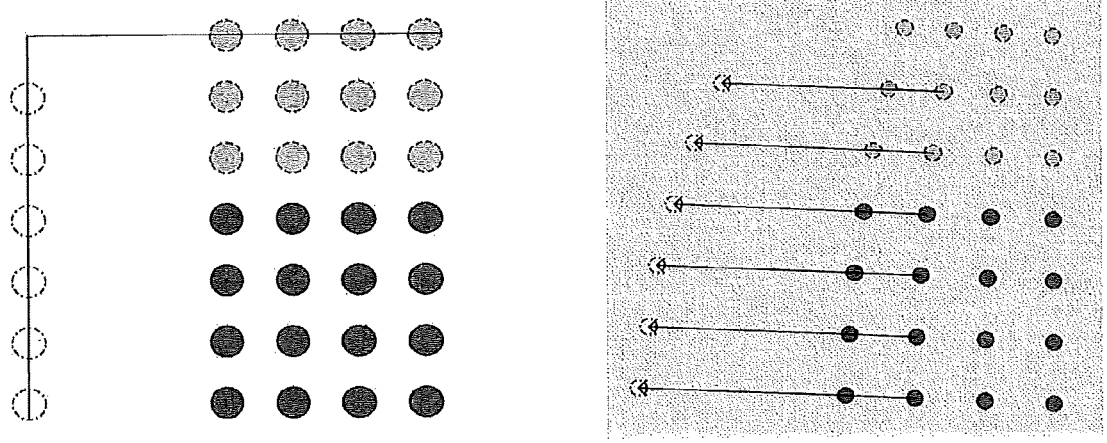
FIG. 23B is another diagram illustrating a process at each stage of an extrapolation prediction process executed by an image processing apparatus in a video projection system according to another embodiment.

Hereinafter, with reference to FIGS. 22, 23A to 23C, an exploration prediction process in the calibration process will be described in more detail. FIG. 22 is a flowchart illustrating an extrapolation prediction process executed by an image processing apparatus 110 in a video projection system 100 according to another embodiment. FIGS. 23A to 23C are diagrams illustrating a process at each stage of the extrapolation prediction process in the video projection system 100 according to another embodiment.

As illustrated in FIG. 3A, the first calibration image 200 output from the projector 150 includes a calibration pattern 206 in which graphic elements (circles in FIG. 3A) are arranged. However, the calibration pattern 206 occupies a portion of the central area of the calibration image 200, and a blank area exists outside the calibration pattern 206. This blank area is provided in order to prevent grid points from being detected in a state in which some graphic elements are missing or distorted, which is typically caused by the calibration pattern being projected out of the screen 102. A target projection area on which content is projected may be set only in the area inside the calibration pattern 206, but in this case, the image area that may be effectively used will narrow. Therefore, it is desirable to perform calibration including the blank area outside the calibration pattern 206. Thus, the extrapolation predictor 170 according to another embodiment calculates correspondence between the grid points in the blank area outside the calibration pattern 206 and coordinates on the coordinate system of the captured image.

FIGS. 23A to 23C are diagrams each illustrating a processing at a corresponding stage in the extrapolation prediction process. In FIGS. 23A to 23C, the left-hand side drawings represent grid points around the upper left corner on the projector memory and the right-hand side drawings represent the coordinates on the captured image coordinate system of the corresponding grid points. In each of FIGS. 23A to 23C, black circles represent actually measured grid points, and broken line circles, dash-dot circles and dotted circles represent extrapolated grid points. Among the dash-dot circles and dotted circles, the circles filled in gray each represent extrapolation grid points that have already been predicted by that stage.

The process illustrated in FIG. 22 is retrieved in processes requiring extrapolation grid points such as steps S302, S303, and S304 illustrated in FIG. 21, and starts from step S400. In step S401, the image processing apparatus 110 acquires a set of actually measured grid points by the extrapolation predictor 170. In addition, as illustrated in FIG. 23A, coordinate information on the captured image coordinate system is fixed to the actually measured grid points (black circles). For example, after the actually measured grid points are integrated on a single coordinate system, each of actually measured grid points holds coordinate information on the integrated coordinate system.

In the loop from step S402 to step S406, the processes illustrated in steps S403 to S405 are executed in each of the upward and downward directions. In step S403, the image processing apparatus 110 causes the vertical extrapolation calculator 172 to calculate coordinates of each extrapolated grid point extrapolated upwardly (or downwardly) by a predetermined interval with respect to each column (each array in the vertical direction) of the calibration pattern, using the coordinates of the predetermined number of current outermost grid points. In step S403 performed at first time, the current grid point which is the basis of the calculation includes the measured grid point given in step S401.

The extrapolation calculation in step S403 may be calculated using a quadratic or higher-order function form. In the extrapolation calculation in step S403 according to another embodiment, based on the coordinates of the three outermost grid points, coordinates of the extrapolated grid points extrapolated by a predetermined interval from the outermost grid points are calculated by a quadratic curve. The predetermined interval at the extrapolation in this case is an interval on the projector memory, and an interval such as one row or a half row of the calibration pattern array is set.

When X[0150] is a position vector of the current outermost grid point (which will be the extrapolated grid point obtained in the steps preceding step S403 at the second and subsequent times as described later), X[0151] is a position vector of the grid point positioned inward by one row from the position vector of the current outermost grid point, and X[0152] is a position vector of the grid point positioned inward by two rows from the position vector of the current outermost grid point, a curve passing through three points X[0153], X[0154] and X[0155] is represented by the following formula (1) which is a quadratic function using the parameter t.

[Math 2]

$$X[t] = \frac{(1-t)(2-t)}{2} \times X[0] + t(2-t) \times X[1] + \frac{t(t-1)}{2} \times X[2] \quad (1)$$

The curve represented by the above formula (1) passes through X[0157] when t=2, passes through X[0158] when t=1, and passes through X[0159] when t=0. Then, in a case of extrapolating grid points by one row, the calculation may be performed using the following formula (2) obtained by substituting t=−1 into the above formula (1).

[Math 3]

$$X[-1]=3 \times X[0]-3 \times X[1]+X[2] \quad (2)$$

In the preferred embodiment, the vertical extrapolation calculator 172 may be enabled to directly use the coordinates of the grid points extrapolated in the vertical direction in the quadratic function form as the estimated coordinates. In another embodiment, the vertical extrapolation calculator 172 may be enabled to use the following formula (3) to calculate estimated coordinates by multiplying each of the coordinates of the grid points extrapolated vertically in the linear function form and the coordinates of the vertically extrapolated grid points in the quadratic function form by a predetermined weight R. Note that a case where the weight R=100 corresponds to the preferred embodiment in which the coordinates of the above-mentioned extrapolated grid points are directly used as the estimated coordinates.

[Math 4]

$$\text{ESTIMATED COORDINATES} = \quad (3)$$
$$\text{PTIMARY EXTRAPOLATED COORDINATES} \times \frac{(100-R)}{100} +$$
$$\text{SECONDARY EXTRAPOLATED COORDINATES} \times \frac{R}{100}$$

When X[0162] is the position vector of a current outermost grid point and X[0163] is the position vector of a grid point positioned inward by one row from the current outermost grid point, a straight line passing through the two points of X[0164] and X[0165] is represented by the following formula (4) which is a linear function using the parameter t.

[Math 5]

$$X[t]=(1-t) \times X[0]+t \times X[1] \quad (4)$$

The straight line represented by the above formula (4) passes through X[0167] when t=1 and passes through X[0168] when t=0. Then, in a case of extrapolating grid points by one row, the calculation may be performed using the following formula (5) obtained by substituting t=−1 into the above formula (4).

[Math 6]

$$X[-1]=2 \times X[0]-X[1] \quad (5)$$

In step S403, extrapolation grid points are obtained for each of columns arranged in the horizontal direction of the calibration pattern 206. In step S404, the image processing apparatus 110 smoothes the coordinates of the extrapolated grid points of each extrapolated row by the vertical extrapolation calculator 172. Note that the smoothing may be performed, for example, by obtaining the centroid of the coordinates of the grid points extrapolated to three adjacent rows as the coordinates of the grid points of the center row. By this smoothing, waviness of the extrapolated grid points may be reduced, and the accuracy of the extrapolation may be improved. Note that the process in step S404 is preferably executed from the viewpoint of improving the calibration accuracy, but this process is optional.

In step S405, the image processing apparatus 110 determines whether the extrapolated grid point has reached the upper end (or lower end) as a result of being extrapolated in upward (or downward) direction by a predetermined interval. In step S405, when it is determined that the extrapolated grid point has not reached the upper end (or the lower end) (NO), the process is looped to step S403, and the processes of steps S403 and S404 are repeated until the extrapolated grid point reaches the upper end (or the lower end). In step S405, when it is determined that the extrapolated grid point has reached the upper end (or the lower end) (YES), the process moves to step S406.

Note that whether the extrapolated grid point has reached the upper end (or the lower end) may be determined based on the relationship between the predefined calibration pattern 206 and the outer peripheral edge defined outside the calibration pattern 206. For example, when a definition is made such that a graphic element of a calibration pattern is provided at a position inward by 2.5 rows on the projector memory, the upper end (or lower end) is defined as being positioned upward (or downward) by 2.5 rows from the outermost grid points in the upward direction (or downward direction). In this way, the calculation of the coordinates of the extrapolation grid point is repeated until the extrapolated grid point reaches the upper end (or the lower end).

In step S403 at the second and subsequent times, the coordinates of the grid points to be further extrapolated are calculated based on the coordinates of the multiple grid points at the time of calculation. For the current grid points in step S403 at the second and subsequent times, the measured grid point given in step S401 and the extrapolated grid point obtained in the preceding step S403 are included. In this case, the coordinates of the grid points which are the basis of the calculation are smoothed coordinates when the smoothing is performed in step S404. Further, the upper end is not always defined as an integral multiple of the row from the outermost measured grid points. Hence, in the final round of step S403, an appropriate interval may be estimated (e.g., 2.5 rows–1 row×2 times=0.5 rows) from the relationship between the predefined calibration pattern and its outer peripheral edge, and the extrapolated coordinates (e.g., X[−0.5]) corresponding to a fraction (e.g., 0.5 rows) may be calculated.

The coordinates of the extrapolation grid points (in the example of FIG. 23, the third time) located at the upper side and the lower side of the projectable area of a target projector 150 and the coordinates of the extrapolation grid points at the intermediate position (in the example of FIG. 23A, the first and second times) of the projectable area in the captured image coordinate system of the given actually measured grid points may be calculated by extrapolation prediction as illustrated in FIG. 23A.

When the processes in steps S403 to S405 are executed for both the upward direction and the downward direction, the process exits from the loop of steps S402 to S406 and the process moves to step S407. In the loop of steps S407 to S409, the process of step S408 is executed for each of the leftward direction and the rightward direction. In step S408, the image processing apparatus 110 calculates grid points extrapolated to the left end (or the right end) by using the predetermined number of outermost grid points for each row by the horizontal extrapolation calculator 174.

In another embodiment, the extrapolation calculation in step S408 may be performed by linear extrapolation using a linear function form. In the following embodiment, coordinates of the extrapolated grid points extrapolated to the left side (or the right side) by a predetermined interval from the outermost grid points may be calculated by a linear function form from the coordinates of two grid points positioned outermost in the horizontal direction. The predetermined interval in extrapolation here may be an interval used for extrapolating grid points to the predefined left end (or right end) at once (simultaneously). For example, when a definition is made such that a graphic element of a calibration pattern is provided a position inward by 2.5 rows on the projector memory, the left end (or right end) is defined as being positioned leftward or (rightward) by 2.5 rows from the outermost grid points in the leftward direction (or rightward direction).

In this way, the coordinates of the extrapolated grid points on the left side and the right side of the projectable area of the target projector 150 in the captured image coordinate system are calculated by extrapolation prediction as illustrated in FIG. 23B.

When the process in step S408 is executed for both the leftward direction and the rightward direction, the process exits from the loop of steps S407 to S409 and the process moves to step S410. In the loop of steps S410 to S412, the process of step S411 is executed for each of upper left, lower left, upper right and lower right corners. In step S411, the image processing apparatus 110 may be enabled to determine coordinates of a grid point of a corresponding one of the upper left, lower left, upper right, and lower right corners by the extrapolation predictor 170 using three grid points adjacent to the grid point of the corresponding corner, among the upper left, lower left, upper right, and lower right corners.

The coordinates of the grid point of the corner in step S411 are not particularly specified; for example, as illustrated in FIG. 23C, the coordinates of the grid point of the corner in step S411 may be determined such that four grid points located on the outer peripheral portion form parallelograms. Alternatively, as illustrated in FIG. 23C, since extrapolated grid points are obtained for the upper side and the lower side, in yet another embodiment, coordinates of the four corners may be determined by extrapolating grid points from the two outermost extrapolation grid points on the upper side or the lower side toward the horizontal direction at once (simultaneously).

When the process in step S411 is executed for all the corners, the process exits from the loop of steps S410 to S412 and the process moves to step S410. In step S413, the image processing apparatus 110 causes the extrapolation predictor 170 to return a table that associates all the grid points including the measured grid points and the extrapolated grid points, with the coordinates on the captured image coordinate system to the process of the request source, and the process ends in step S414.

Note that as with the calculation of the extrapolated grid points described above, the coordinates on the captured image coordinate system corresponding to any coordinate point on the projector memory other than the coordinates of the measured grid point and the extrapolated grid point may also be obtained by interpolating grid point coordinates of the four nearby points.

With respect to the four grid points $P00_P$, $P10_P$, $P01_P$, and $P11_P$ having nearby coordinate positions on the projector memory, a given coordinate point QP on the projector memory is assumed to be an internally dividing point by t: 1−t (0<t<1) in the x axis direction and s: 1−s (0<s<1) in the y axis direction.

The point QC on the captured image coordinate system corresponding to the coordinate point QP may be calculated from a coordinate vector of the corresponding four grid points $P00_C$, $P10_C$, $P01_C$, and P1 using the following formula (6).

[Math 7]

$$Q_c=(1-s)((1-t)P00_C+tP10_C)+s((1-t)P01_C+tP11_C) \quad (6)$$

Although it is assumed that nonlinear geometric distortion may occur in the whole image, such geometric distortion may be regarded as linear geometric distortion in the range of a quadrilateral patch composed of 2×2 grid points, which is a part of the image. This is because the size of the quadrilateral patch may be regarded as being sufficiently small.

In step S413 above, by using the formula (6) above, coordinates of the grid points may be obtained with a finer grain mesh (e.g., mesh with intervals of 0.5 rows and 0.5 columns), and a table associating the obtained coordinates and the coordinates on the captured image coordinate system may be created.

Correction Coefficient Calculation Process Using Extrapolation Grid Points

According to the preferred embodiment, the extrapolated grid points obtained above may be used (1) for calculating the geometric correction coefficient of each projector 150.

By using the extrapolation grid points obtained with high precision and detecting the OR area of the projectable area, it is possible to appropriately set the projection target area for mapping the content image on the integrated coordinate system. Further, by calculating geometric correction coefficients using extrapolation grid points determined with high accuracy, it is possible to accurately determine correspondence between coordinates on the projector memory and pixel positions on the content image including the area outside the calibration pattern.

Further, in a preferred embodiment, the extrapolation grid points obtained above may be used (2) for calculating blending coefficients for blending projection images by projectors.

By detecting the superimposed area between adjacent projectors using the extrapolation grid points that are obtained with high accuracy, it is possible to correctly distinguish the coordinates on the projector memory between those in an area projected by the projector alone and those in an area blended with the projected image of the adjacent projector. By calculating blending coefficients using extrapolation grid points that are determined with high accuracy, calculation of the blending coefficient may be accurately obtained including the area outside the calibration pattern with respect to each coordinate position on the projector memory.

Grid Point Combination Process Using Extrapolation Grid Points

In a further preferred embodiment, the extrapolated grid points obtained above may be used (3) for determining whether the obtained extrapolated grid points each correspond to a single area or a superimposed area with adjacent projectors in order to combine multiple sets of grid points in different imaging ranges with respect to a predetermined projector 150.

Note that the process of combining multiple sets of grid points having different imaging ranges is the same as the grid point extraction integrating process described with reference to FIGS. 9 to 13; for example, in the step S260, the grid point extrapolation process up to the above may be applied when detecting an area superimposed in the projection ranges of the left and right adjacent projectors. For each projector, the outer peripheral edge defined by the outermost extrapolation grid points is the projection range on the captured image coordinate system. Further, in step S211, for obtaining an area enclosed by the outer peripheral edge, the grid point extrapolation process up to the above may be applied.

FIG. 13 is a diagram schematically illustrating sets of grid point coordinates of respective projectors that are integrated on the integrated coordinate system 300. It is possible to calculate the geometric correction coefficient and the blending coefficient with high accuracy including the area outside the calibration pattern by applying the aforementioned grid point extrapolation process using, as the measured grid points, sets 302a, 302b, 302c, and 302d of grid point coordinates of respective projectors that are integrated onto this single coordinate system. When sets of grid points for each projector including the extrapolation grid points are obtained, there is no particular change in the methods of calculating the geometric correction coefficient and the blending coefficient. Hence, a further detailed description on the correction coefficient calculation will be omitted.

Note that that after grid points are converted onto a common coordinate system common to the multiple captured calibration images captured in different imaging ranges, the grid points may be combined and the combined grid points may further be converted onto a single integrated coordinate system; however, the order of conversion is not particularly specified. For example, the grid points may be converted onto a single integrated coordinate system first and may be combined thereafter.

Advantages of Calibration Process Based on Extrapolation Prediction Results

Figure 24C:
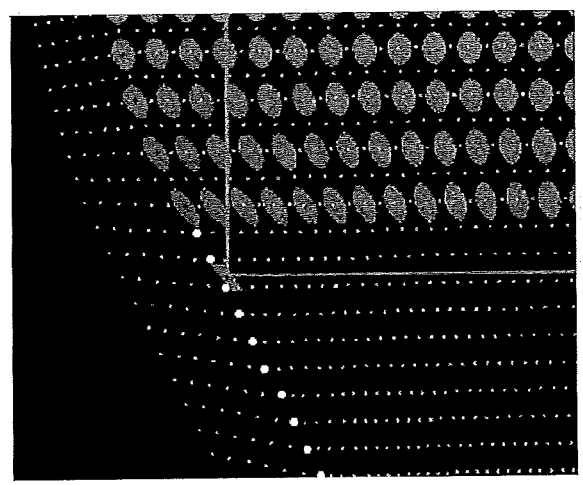
FIG. 24C is another view illustrating calibration accuracy based on a linear extrapolation prediction result in another embodiment.

The following illustrates, with reference to FIGS. 24A to 24D and FIGS. 25A to 25C, the accuracy of superimposition of projected images of the projectors 150, which is improved by the calibration process based on the extrapolation prediction results according to another embodiment. FIG. 24A is a view depicting an example of a captured calibration image obtained by projecting a first calibration image (note that the specific arrangements of a calibration pattern and an alignment pattern are not the same as those illustrated in FIGS. 3A and 3B) onto a curved surface screen 102 having a curve only in the vertical direction using an ultrashort focus projector, and capturing the projected image from the front of the screen 102. As illustrated in FIG. 24A, when the first calibration image is projected onto the curved surface screen 102 having a curve only in the vertical direction using the ultrashort focus projector, the projected image is largely distorted into a barrel shape, and is partly protruded from the screen 102. Hence, it is understood that columns in the vertical directions of the projected calibration pattern may form a large curved profile.

FIG. 24B is a view depicting a superimposed portion of the projected images of two projectors obtained when the two short focus projectors are calibrated using the extrapolation grid points obtained by linear extrapolation in both the vertical direction and the horizontal direction. As depicted in FIG. 24B, when the extrapolation grid points obtained by linear extrapolation are used, the extrapolation prediction portion at lower parts of respective short focus projectors results in being widened, which will be corrected to be narrowed inward as a correction result. Therefore, in the superimposed portion of the left projector and the right projector, as indicated by two arrows in the figure, the projected image of the left projector is corrected by being curved leftward compared to the actual projected image, and the projected image of the right projector is corrected by being curved rightward compared to the actual projected image. Thus, as an image, characters are shifted to the left and right.

Figure 24D:
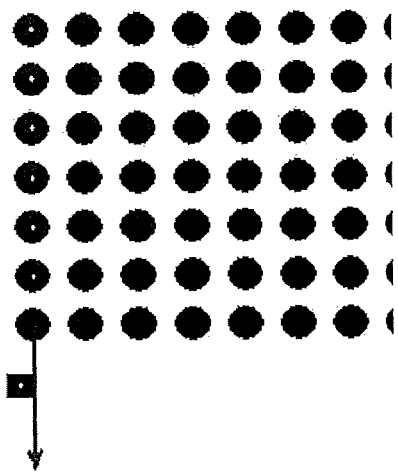
FIG. 24D is another view illustrating calibration accuracy based on a linear extrapolation prediction result in another embodiment.

FIG. 24C is a view illustrating an example of extrapolation grid points obtained by linear extrapolation in both the vertical and horizontal directions. Black dots indicate measured grid points in the corresponding column and white dots indicate extrapolation grid points in the corresponding column. By contrast, FIG. 24D is a view illustrating a part of the first calibration image, where white dots indicate circles in the corresponding row and the center point of the alignment pattern. Referring to FIG. 24D, extrapolation prediction trajectory is intended to pass through the right end of the alignment pattern positioned outward; however, the result of the linear prediction depicted in FIG. 24C indicates that the extrapolation prediction trajectory passes through the left end of the alignment pattern. As is clear from comparison between FIG. 24C and FIG. 24D, the extrapolation prediction trajectory has been further opened to the left than predicted. Hence, when the extrapolation prediction in the vertical direction of the calibration pattern is predicted linearly, an error increases in the outside area, in particular, in a case of multi-projection performed by the ultrashort focus projector on the curved surface screen being curved only in the vertical direction. This causes deterioration of image quality of the projection image with the multi-projection as misalignment of superimposition of the projected images.

Figure 25A:
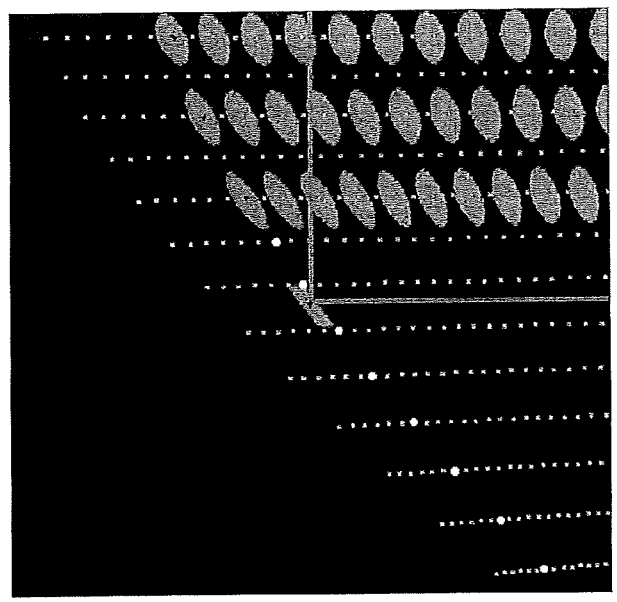
FIG. 25A is a view illustrating accuracy in superimposition of projected images based on extrapolation prediction results according to another embodiment.
Figure 25B:
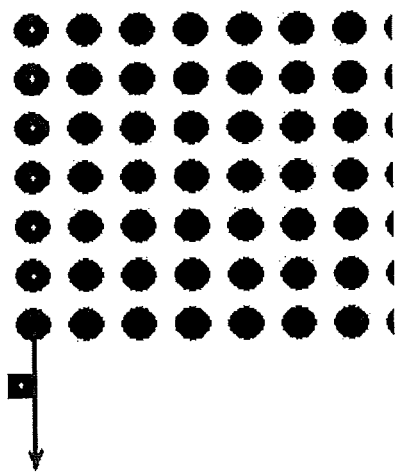
FIG. 25B is another view illustrating accuracy in superimposition of projected images based on extrapolation prediction results according to another embodiment.

By contrast, FIG. 25A depicts an example illustrating extrapolation grid points obtained by linear extrapolation in the horizontal direction and quadratic extrapolation (R=100) in the vertical direction. As with the example of FIG. 24C, black dots indicate measured grid points in the corresponding column and white dots indicate extrapolation grid points in the corresponding column. FIG. 25B is the same view as FIG. 24D, which is aligned with respect to FIG. 25A. As is clear from the comparison between FIG. 25A and FIG. 25B, the trajectory obtained by the extrapolation prediction process according to the other embodiment passes through the right end of the alignment pattern as predicted as depicted, as illustrated in FIG. 25B.

Figure 25C:
FIG. 25C is another view illustrating accuracy in superimposition of projected images based on extrapolation prediction results according to another embodiment.

FIG. 25C is a view depicting a superimposed portion of the projected images of two projectors obtained when the two short focus projectors are calibrated using the extrapolation grid points obtained by linear extrapolation in the horizontal direction and quadratic extrapolation in the vertical direction. As is clear from the comparison with FIG. 24B, in the superimposed projection image depicted in FIG. 25C, the projected images are corrected such that projected images are superimposed without misalignment. As described above, it is possible to improve image quality of the projection image of the multi projection using the ultrashort focus projector based on the calibration using the extrapolation grid points by extrapolation with a quadratic or higher function in a direction corresponding to the direction in which the screen 102 has a curve in conjunction with the grid point combining process described above.

Hardware Configuration

Figure 26:
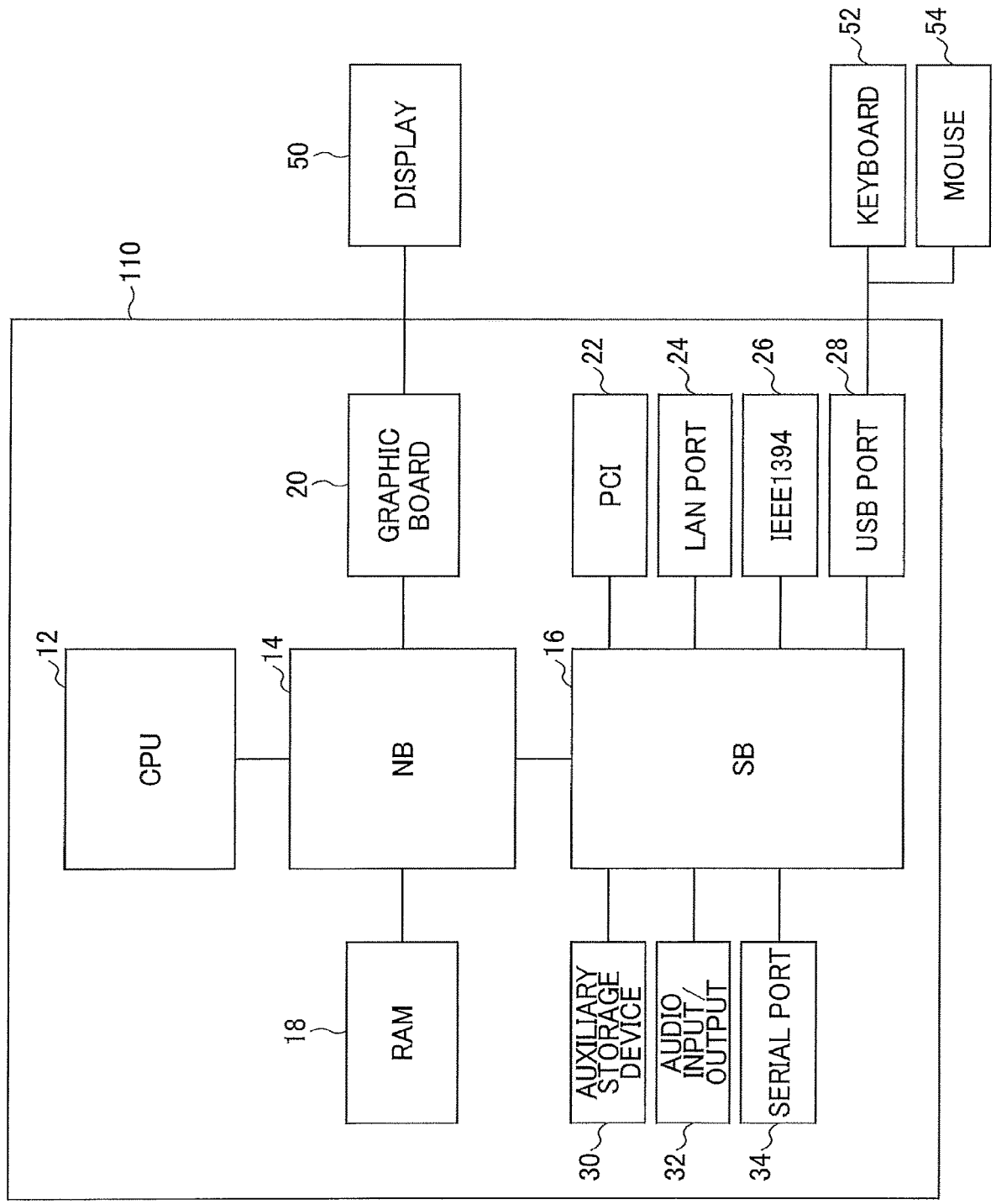
FIG. 26 is a diagram illustrating a hardware configuration of a general-purpose computer apparatus constituting an image processing apparatus according to one or more embodiments.

The following illustrates a hardware configuration of the image processing apparatus 110 in one or more embodiments described above with reference to FIG. 26. The image processing apparatus 110 is typically configured as a general purpose computer apparatus. FIG. 26 is a diagram illustrating a hardware configuration of a general-purpose computer apparatus according to one or more embodiments.

The general-purpose computer apparatus is configured as a desktop type personal computer, a workstation, or the like. The general-purpose computer apparatus illustrated in FIG. 26 includes a CPU (Central Processing Unit) 12, a north bridge 14 which is responsible for connecting the CPU 12 with a memory, and a south bridge 16. The south bridge 16 is connected to the north bridge 14 via a dedicated bus or a PCI bus, and is responsible for connection with I/O such as PCI bus or USB.

The north bridge 14 is connected to a RAM (Random Access Memory) 18 configured to provide a work area of the CPU 12 and a graphic board 20 configured to output a video signal. The graphic board 20 is connected to a display 50 and a projector (not illustrated) via a video output interface such as analog RGB, HDMI (registered trademark), High-Definition Multimedia Interface (registered trademark), DVI (Digital Visual Interface), DisplayPort (registered trademark), and the like.

The south bridge 16A is connected to a PCI (Peripheral Component Interconnect) 22, a LAN port 24, an IEEE 1394, a USB (Universal Serial Bus) port 28, an auxiliary storage device 30, an audio input/output 32, and a serial port 34. The auxiliary storage device 30 is an HDD (Hard Disk Drive), an SSD (Solid State Drive), and the like; the auxiliary storage device 30 is configured to store an OS for controlling the computer apparatus, a program for implementing the above-described functional units, various system information and various setting information. The LAN port 24 is an interface device for connecting a general-purpose computer apparatus to a network in a wired and wireless manner.

A USB port 28 is connected to input devices such as a keyboard 52 and a mouse 54, and the USB port 28 is configured to provide a user interface for receiving input of various instructions from an operator. The general-purpose computer apparatus according to an embodiment reads a program from the auxiliary storage device 30 and loads the program in a work space provided by the RAM 18, thereby implementing each of the above-described functional units and processes under the control of the CPU 12. Note that the projector 150 and the camera 160 are not specifically described; however, the projector 150 and the camera 160 are similarly provided with hardware such as a CPU, a RAM, and the like, and hardware according to a specific use.

As described above, according to an embodiment of the present invention, it is possible to provide a projection system, an image processing apparatus, a projection method, and a program for projecting an image on a projection object having a curve in one direction by one or more projection units capable of correcting the projected image in consideration of observation from multiple viewpoints.

Further, according to another embodiment of the present invention, it is possible to provide an image processing apparatus, an imaging system, an image processing method, and a program capable of obtaining, from an image including a pattern, coordinates of a feature point extrapolated to an outside area of multiple feature points corresponding to the pattern with high accuracy. Calibration of the projection units using coordinates of the feature points extrapolated to the outside area will provide improved image quality when the projected images of the plurality of projection units are superimposed; specifically, when as fort focus projector is used for projection.

There are many surface portions having a curve only in a vertical direction on the plane around us; such surface portions include side surfaces and ceilings of a train and the like, arch-shaped ceilings of tunnels, arcade shopping streets, and the like. However, these curved surface shapes are not necessarily geometrically simple curved surfaces. According to the projection system of the embodiment, it is possible to easily perform a calibration process on any screen having a curved surface.

The functional units may each be implemented by a computer executable program described in a legacy programming language such as an assembler, an object-oriented programming language such as C, C++, C#, Java (registered trademark), and the like, which may be distributed by being stored in a computer-readable recording medium such as a ROM, an EEPROM, an EPROM, a flash memory, a flexible disk, a CD-ROM, a CD-RW, a DVD-ROM, a DVD-RAM, a DVD-RW, a Blu-ray disc, SD card, MO, and the like, or may be distributed through an electric communication line. Further, some or all of the above functional units may be implemented on a programmable device (PD) such as a field programmable gate array (FPGA), or may be implemented as ASIC (application specific integrated), which may be distributed via a recording medium as data described in circuit configuration data (bit stream data) downloaded to the PD, HDL (Hardware Description Language) for generating circuit configuration data, VHDL (Very High Speed Integrated Circuits (VHSIC) Hardware Description Language), Verilog-HDL, or the like.

Although the embodiments of the present invention have been described above, the embodiments of the present invention are not limited to the above-described embodiments. In other words, one skilled in the art can make various changes to the present invention, with reference to the known conventional art, without departing from the scope of the present invention. It is needless to say that such changes are still included in the scope of the present invention as long as the configurations of the wireless communication apparatus and the mobile device of the present invention are provided.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

Advantage of the Invention

According to the above-described configuration, a projection system for projecting an image on a projection body having a curve in one direction using one or more projection units is enabled to correct the projected image in consideration of observation from a plurality of viewpoints.

Further, the present invention is not limited to these embodiments and examples described above, but various variations and modifications may be made without departing from the scope of the present invention.

What is claimed is:

1. A projection system for projecting an image by one or more projectors onto a projection body having a curve in one direction, the projection system comprising:
one or more processors;
a memory storing instructions that, when executed by the one or more processors, cause the projection system to:
extract a set of grid points indicating distortion of a projected image from each of a plurality of captured calibration images prepared;
convert each set of grid points of a target projector commonly extracted from a selected plurality of captured calibration images selected from among the plurality of captured calibration images onto a common coordinate system, the selected plurality of captured calibration images having a calibration pattern projected on the projection body captured in different imaging ranges in association with the one direction;
combine a plurality of the converted sets of grid points of the target projector on the common coordinate system in accordance with position by calculating coordinate values with respect to a grid point corresponding to a single projection area projected by the target projector alone by blending coordinate values of the plurality of sets of grid points in accordance with position; and
calculate a correction coefficient based on the combined sets of grid points,
wherein the different imaging ranges in which the selected plurality of captured calibration images are captured indicate respective imaging ranges within which the calibration pattern projected on the projection body is imaged at positions shifted along a direction substantially perpendicular to the one direction in which the projection body has the curve.

2. The projection system according to claim 1, wherein the plurality of captured calibration images further include an adjacent-projector-captured calibration image having the calibration pattern projected on the projection body by an adjacent projector adjacent to the target projector, and wherein in a case where the target projector has the adjacent projector on one side thereof along a direction substantially perpendicular to the one direction having the curve in arrangement of projected images and has no adjacent projector on the other side thereof, the processors further cause the projection system to:
distinguish between grid points of the target projector corresponding to the single projection area not superimposed in a projection range of the adjacent projector and grid points of the target projector superimposed in the projection range of the adjacent projector, among the grid points of the target projector; and
calculate coordinate values with respect to the grid points of the target projector superimposed in the projection range of the adjacent projector, using coordinate values of a converted set of grid points of the target projector based on one of the selected plurality of captured calibration images that is imaged substantially in a same imaging range as an imaging range of the adjacent-projector-captured calibration image.

3. The projection system according to claim 1, wherein the processors further cause the projection system to:
extract an alignment point of the projected image from each of the plurality of captured calibration images; and
convert the commonly extracted each set of grid points of the target projector onto the common coordinate system, based on the alignment point extracted from a corresponding one of the plurality of captured calibration images.

4. The projection system according to claim 1, wherein the processors further cause the projection system to:
prepare a captured scale image obtained by imaging a physical scale fixed to a surface of the projection body and extending in substantially a same direction as the one direction in which the projection body has the curve, such that the imaged physical scale is positioned in substantially a center of an imaging range; and
perform coordinate correction in the one direction based on the captured scale image.

5. The projection system according to claim 1, wherein the processors further cause the projection system to:
cause one of or both of a projection device and an imaging device to obtain a captured calibration image, the projection device indicating each of the projectors.

6. The projection system according to claim 1, wherein the processors further cause the projection system to:
calculate coordinates of a grid point to be extrapolated in a first direction being curved by a quadratic or higher-order function form, based on coordinates of a plurality of grid points arranged in the first direction selected from among the plurality of extracted grid points;
calculate coordinates of a grid point to be extrapolated in a second direction differing from the first direction, based on coordinates of a plurality of grid points arranged in the second direction selected from among the plurality of extracted grid points; and calculate a correction coefficient with respect to an image projected from each of the one or more projectors based on the extracted grid points and the extrapolated grid points.

7. An image processing apparatus for projecting an image onto a projection body having a curve in one direction by one or more projectors, the image processing apparatus comprising:

one or more processors;

a memory storing instructions that, when executed by the one or more processors, cause the image processing apparatus to:

extract a set of grid points indicating distortion of a projected image from each of a plurality of captured calibration images prepared;

convert each set of grid points of a target projector commonly extracted from a selected plurality of captured calibration images selected from among the plurality of captured calibration images onto a common coordinate system, the selected plurality of captured calibration images having a calibration pattern projected on the projection body captured in different imaging ranges in association with the one direction;

combine a plurality of the converted sets of grid points of the target projector on the common coordinate system in accordance with position by calculating coordinate values with respect to a grid point corresponding to a single projection area projected by the target projector alone by blending coordinate values of the plurality of sets of grid points in accordance with position; and calculate a correction coefficient based on the combined sets of grid points, wherein the different imaging ranges in which the selected plurality of captured calibration images are captured indicate respective imaging ranges within which the calibration pattern projected on the projection body is imaged at positions shifted along a direction substantially perpendicular to the one direction in which the projection body has the curve.

8. A computer-implemented projection method for projecting an image onto a projection body having a curve in one direction by one or more projectors, the computer-implemented projection method comprising:

preparing, by a computer device, a plurality of captured calibration images;

extracting, by a computer device, a set of grid points indicating distortion of a projected image from each of the plurality of captured calibration images prepared;

converting, by a computer device, each set of grid points of a target projector commonly extracted from a selected plurality of captured calibration images selected from among the plurality of captured calibration images onto a common coordinate system, the selected plurality of captured calibration images having a calibration pattern projected on the projection body captured in different imaging ranges in association with the one direction;

combining, by a computer device, a plurality of the converted sets of grid points of the target projector on the common coordinate system in accordance with position by calculating coordinate values with respect to a grid point corresponding to a single projection area projected by the target projector alone by blending coordinate values of the plurality of sets of grid points in accordance with position; and calculating, by a computer device, a correction coefficient based on the combined sets of grid points, wherein the different imaging ranges in which the selected plurality of captured calibration images are captured indicate respective imaging ranges within which the calibration pattern projected on the projection body is imaged at positions shifted along a direction substantially perpendicular to the one direction in which the projection body has the curve.

9. The method according to claim 8, wherein:

the plurality of captured calibration images further include an adjacent-projector-captured calibration image having the calibration pattern projected on the projection body by an adjacent projector adjacent to the target projector, and in a case where the target projector has the adjacent projector on one side thereof along a direction substantially perpendicular to the one direction having the curve in arrangement of projected images and has no adjacent projector on the other side thereof, the method further performs:

distinguishing between grid points of the target projector corresponding to the single projection area not superimposed in a projection range of the adjacent projector and grid points of the target projector superimposed in the projection range of the adjacent projector, among the grid points of the target projector; and calculating coordinate values with respect to the grid points of the target projector superimposed in the projection range of the adjacent projector, using coordinate values of a converted set of grid points of the target projector based on one of the selected plurality of captured calibration images that is imaged substantially in a same imaging range as an imaging range of the adjacent-projector-captured calibration image.

10. The method according to claim 8, further comprising:

extracting an alignment point of the projected image from each of the plurality of captured calibration images; and converting the commonly extracted each set of grid points of the target projector onto the common coordinate system, based on the alignment point extracted from a corresponding one of the plurality of captured calibration images.

11. The method according to claim 8, further comprising:

preparing a captured scale image obtained by imaging a physical scale fixed to a surface of the projection body and extending in substantially a same direction as the one direction in which the projection body has the curve, such that the imaged physical scale is positioned in substantially a center of an imaging range; and performing coordinate correction in the one direction based on the captured scale image.

12. The method according to claim 8, further comprising:

causing one of or both of a projection device and an imaging device to obtain a captured calibration image, the projection device indicating each of the projectors.

13. The method according to claim 8, further comprising:

calculating coordinates of a grid point to be extrapolated in a first direction being curved by a quadratic or higher-order function form, based on coordinates of a plurality of grid points arranged in the first direction selected from among the plurality of extracted grid points;

calculating coordinates of a grid point to be extrapolated in a second direction differing from the first direction, based on coordinates of a plurality of grid points arranged in the second direction selected from among the plurality of extracted grid points; and calculating a correction coefficient with respect to an image projected from each of the one or more projectors based on the extracted grid points and the extrapolated grid points.

14. The image processing apparatus according to claim 7, wherein the plurality of captured calibration images further include an adjacent-projector-captured calibration image having the calibration pattern projected on the projection body by an adjacent projector adjacent to the target projector, and wherein in a case where the target projector has the adjacent projector on one side thereof along a direction substantially perpendicular to the one direction having the curve in arrangement of projected images and has no adjacent projector on the other side thereof, the processors further cause the projection system to:

distinguish between grid points of the target projector corresponding to the single projection area not superimposed in a projection range of the adjacent projector and grid points of the target projector superimposed in the projection range of the adjacent projector, among the grid points of the target projector; and calculate coordinate values with respect to the grid points of the target projector superimposed in the projection range of the adjacent projector, using coordinate values of a converted set of grid points of the target projector based on one of the selected plurality of captured calibration images that is imaged substantially in a same imaging range as an imaging range of the adjacent-projector-captured calibration image.

* * * * *